US010061385B2

(12) United States Patent
Churikov et al.

(10) Patent No.: US 10,061,385 B2
(45) Date of Patent: Aug. 28, 2018

(54) HAPTIC FEEDBACK FOR A TOUCH INPUT DEVICE

(71) Applicant: Microsoft Technology Licensing, LLC, Redmond, WA (US)

(72) Inventors: Anatoly Yuryevich Churikov, Las Vegas, NV (US); Flavio Protasio Ribeiro, Bellevue, WA (US); Carl E. Picciotto, Clyde Hill, WA (US); Aric A. Fitz-Coy, Seattle, WA (US); Steven Nabil Bathiche, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/004,423

(22) Filed: Jan. 22, 2016

(65) Prior Publication Data

US 2017/0212591 A1   Jul. 27, 2017

(51) Int. Cl.
*G06F 3/041* (2006.01)
*G06F 3/0488* (2013.01)
*G06F 3/01* (2006.01)
*G06F 3/0354* (2013.01)

(52) U.S. Cl.
CPC .......... *G06F 3/016* (2013.01); *G06F 3/03547* (2013.01); *G06F 3/0416* (2013.01); *G06F 3/04883* (2013.01)

(58) Field of Classification Search
CPC ...................................................... G06F 3/016
See application file for complete search history.

(56) References Cited

U.S. PATENT DOCUMENTS

| 578,325 | A | 3/1897 | Fleming |
| 4,046,975 | A | 9/1977 | Seeger, Jr. |
| 4,065,649 | A | 12/1977 | Carter et al. |
| 4,243,861 | A | 1/1981 | Strandwitz |
| 4,279,021 | A | 7/1981 | See et al. |
| 4,302,648 | A | 11/1981 | Sado et al. |
| 4,317,013 | A | 2/1982 | Larson |

(Continued)

FOREIGN PATENT DOCUMENTS

| CN | 1722073 | 1/2006 |
| CN | 101763166 | 6/2010 |

(Continued)

OTHER PUBLICATIONS

"Accessing Device Sensors", retrieved from <https://developer.palm.com/content/api/dev-guide/pdk/accessing-device-sensors.html> on May 25, 2012, 2011, 4 pages.

(Continued)

*Primary Examiner* — Amr Awad
*Assistant Examiner* — Stephen Bray

(57) ABSTRACT

Techniques for haptic feedback for a touch input device are described. Generally, haptic feedback is provided for different user interactions with a touch input device, such as interactions with applications, services, and so forth. According to various embodiments, how haptic feedback is initiated depends on whether different functionalities directly support haptic feedback. For instance, techniques described herein enable haptic feedback to be provided whether or not a particular functionality directly supports haptic feedback.

20 Claims, 7 Drawing Sheets

(56) References Cited

U.S. PATENT DOCUMENTS

| | | |
|---|---|---|
| 4,326,193 A | 4/1982 | Markley et al. |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,890,832 A | 1/1990 | Komaki |
| 5,149,923 A | 9/1992 | Demeo |
| 5,220,521 A | 6/1993 | Kikinis |
| 5,283,559 A | 2/1994 | Kalendra et al. |
| 5,331,443 A | 7/1994 | Stanisci |
| 5,480,118 A | 1/1996 | Cross |
| 5,489,900 A | 2/1996 | Cali et al. |
| 5,510,783 A | 4/1996 | Findlater et al. |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,612,719 A | 3/1997 | Beernink et al. |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,859,642 A | 1/1999 | Jones |
| 5,874,697 A | 2/1999 | Selker et al. |
| 5,909,211 A | 6/1999 | Combs et al. |
| 5,926,170 A | 7/1999 | Oba |
| 5,942,733 A | 8/1999 | Allen et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,147,859 A | 11/2000 | Abboud |
| 6,177,926 B1 | 1/2001 | Kunert |
| 6,178,443 B1 | 1/2001 | Lin |
| 6,239,786 B1 | 5/2001 | Burry et al. |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,429,846 B2 | 8/2002 | Rosenberg et al. |
| 6,437,682 B1 | 8/2002 | Vance |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,758,615 B2 | 7/2004 | Monney et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela Aarre |
| 6,819,316 B2 | 11/2004 | Schulz et al. |
| 6,822,635 B2 | 11/2004 | Shahoian |
| 6,856,506 B2 | 2/2005 | Doherty et al. |
| 6,861,961 B2 | 3/2005 | Sandbach et al. |
| 6,864,573 B2 | 3/2005 | Robertson et al. |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,051,149 B2 | 5/2006 | Wang et al. |
| 7,083,295 B1 | 8/2006 | Hanna |
| 7,091,436 B2 | 8/2006 | Serban |
| 7,091,955 B2 | 8/2006 | Kramer |
| 7,095,404 B2 | 8/2006 | Vincent et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,194,662 B2 | 3/2007 | Do et al. |
| 7,202,837 B2 | 4/2007 | Ihara |
| 7,213,991 B2 | 5/2007 | Chapman et al. |
| 7,224,830 B2 | 5/2007 | Nefian et al. |
| 7,245,292 B1 | 7/2007 | Custy |
| 7,277,087 B2 | 10/2007 | Hill et al. |
| 7,301,759 B2 | 11/2007 | Hsiung |
| 7,374,312 B2 | 5/2008 | Feng et al. |
| 7,401,992 B1 | 7/2008 | Lin |
| 7,423,557 B2 | 9/2008 | Kang |
| 7,446,276 B2 | 11/2008 | Piesko |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Cutter et al. |
| 7,542,052 B2 | 6/2009 | Solomon et al. |
| 7,557,312 B2 | 7/2009 | Clark et al. |
| 7,558,594 B2 | 7/2009 | Wilson |
| 7,559,834 B1 | 7/2009 | York |
| RE40,891 E | 9/2009 | Yasutake |
| 7,602,384 B2 | 10/2009 | Rosenberg et al. |
| 7,620,244 B1 | 11/2009 | Collier |
| 7,622,907 B2 | 11/2009 | Vranish |
| 7,636,921 B2 | 12/2009 | Louie |
| 7,639,876 B2 | 12/2009 | Clary et al. |
| 7,656,392 B2 | 2/2010 | Bolender |
| 7,686,694 B2 | 3/2010 | Cole |
| 7,728,820 B2 | 6/2010 | Rosenberg et al. |
| 7,728,923 B2 | 6/2010 | Kim et al. |
| 7,731,147 B2 | 6/2010 | Rha |
| 7,733,326 B1 | 6/2010 | Adiseshan |
| 7,736,042 B2 | 6/2010 | Park et al. |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |
| 7,782,342 B2 | 8/2010 | Koh |
| 7,813,715 B2 | 10/2010 | McKillop et al. |
| 7,815,358 B2 | 10/2010 | Inditsky |
| 7,817,428 B2 | 10/2010 | Greer, Jr. et al. |
| 7,865,639 B2 | 1/2011 | McCoy et al. |
| 7,880,727 B2 | 2/2011 | Abanami et al. |
| 7,884,807 B2 | 2/2011 | Hovden et al. |
| 7,890,863 B2 | 2/2011 | Grant et al. |
| 7,907,394 B2 | 3/2011 | Richardson et al. |
| 636,397 A1 | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,952,566 B2 | 5/2011 | Poupyrev et al. |
| 7,970,246 B2 | 6/2011 | Travis et al. |
| 7,973,771 B2 | 7/2011 | Geaghan |
| 7,976,393 B2 | 7/2011 | Haga et al. |
| 7,978,281 B2 | 7/2011 | Vergith et al. |
| 8,016,255 B2 | 9/2011 | Lin |
| 8,018,386 B2 | 9/2011 | Qi et al. |
| 8,018,579 B1 | 9/2011 | Krah |

(56) References Cited

U.S. PATENT DOCUMENTS

| | | |
|---|---|---|
| 8,022,939 B2 | 9/2011 | Hinata |
| 8,026,904 B2 | 9/2011 | Westerman |
| 8,053,688 B2 | 11/2011 | Conzola et al. |
| 8,063,886 B2 | 11/2011 | Serban et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,090,885 B2 | 1/2012 | Callaghan et al. |
| 8,094,134 B2 | 1/2012 | Suzuki et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,118,681 B2 | 2/2012 | Mattice et al. |
| 8,130,203 B2 | 3/2012 | Westerman |
| 8,154,524 B2 | 4/2012 | Wilson et al. |
| 8,162,282 B2 | 4/2012 | Hu et al. |
| 659,139 A1 | 5/2012 | Gengler |
| 8,169,421 B2 | 5/2012 | Wright et al. |
| 8,189,973 B2 | 5/2012 | Travis et al. |
| 8,216,074 B2 | 7/2012 | Sakuma |
| 8,229,509 B2 | 7/2012 | Paek et al. |
| 8,229,522 B2 | 7/2012 | Kim et al. |
| 8,232,963 B2 | 7/2012 | Orsley et al. |
| 8,267,368 B2 | 9/2012 | Torii et al. |
| 8,269,093 B2 | 9/2012 | Naik et al. |
| 8,274,784 B2 | 9/2012 | Franz et al. |
| 8,279,589 B2 | 10/2012 | Kim |
| 8,279,623 B2 | 10/2012 | Idzik et al. |
| 8,322,290 B1 | 12/2012 | Mignano |
| 8,325,144 B1 | 12/2012 | Tierling et al. |
| 8,330,061 B2 | 12/2012 | Rothkopf et al. |
| 8,330,742 B2 | 12/2012 | Reynolds et al. |
| 8,378,972 B2 | 2/2013 | Pance et al. |
| 8,395,587 B2 | 3/2013 | Cauwels et al. |
| 8,403,576 B2 | 3/2013 | Merz |
| 8,416,559 B2 | 4/2013 | Agata et al. |
| 8,421,757 B2 | 4/2013 | Suzuki et al. |
| 8,487,751 B2 | 7/2013 | Laitinen et al. |
| 8,498,100 B1 | 7/2013 | Whitt, III et al. |
| 8,607,651 B2 | 12/2013 | Eventoff |
| 8,633,916 B2 | 1/2014 | Bernstein et al. |
| 8,638,315 B2 | 1/2014 | Algreatly |
| 8,659,555 B2 | 2/2014 | Pihlaja |
| 8,661,363 B2 | 2/2014 | Platzer et al. |
| 8,674,961 B2 | 3/2014 | Posamentier |
| 8,757,374 B1 | 6/2014 | Kaiser |
| 8,766,925 B2 | 7/2014 | Perlin et al. |
| 8,836,664 B2 | 9/2014 | Colgate et al. |
| 8,847,895 B2 | 9/2014 | Lim et al. |
| 8,854,331 B2 | 10/2014 | Heubel et al. |
| 8,907,871 B2 | 12/2014 | Orsley |
| 8,928,581 B2 | 1/2015 | Braun et al. |
| 8,970,525 B1 | 3/2015 | D Los Reyes |
| 9,047,012 B1 | 6/2015 | Bringert et al. |
| 9,448,631 B2 | 9/2016 | Winter et al. |
| 9,459,160 B2 | 10/2016 | Shaw et al. |
| 2001/0035697 A1 | 11/2001 | Rueger et al. |
| 2001/0035859 A1 | 11/2001 | Kiser |
| 2002/0000977 A1 | 1/2002 | Vranish |
| 2002/0126445 A1 | 9/2002 | Minaguchi et al. |
| 2002/0134828 A1 | 9/2002 | Sandbach et al. |
| 2002/0154099 A1 | 10/2002 | Oh |
| 2002/0188721 A1 | 12/2002 | Lemel et al. |
| 2003/0016282 A1 | 1/2003 | Koizumi |
| 2003/0044215 A1 | 3/2003 | Monney et al. |
| 2003/0083131 A1 | 5/2003 | Armstrong |
| 2003/0107557 A1 | 6/2003 | Liebenow |
| 2003/0132916 A1 | 7/2003 | Kramer |
| 2003/0163611 A1 | 8/2003 | Nagao |
| 2003/0197687 A1 | 10/2003 | Shetter |
| 2003/0201982 A1 | 10/2003 | Iesaka |
| 2004/0005184 A1 | 1/2004 | Kim et al. |
| 2004/0100457 A1 | 5/2004 | Mandle |
| 2004/0174670 A1 | 9/2004 | Huang et al. |
| 2004/0190239 A1 | 9/2004 | Weng et al. |
| 2004/0212598 A1 | 10/2004 | Kraus et al. |
| 2004/0227721 A1 | 11/2004 | Moilanen et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0057515 A1 | 3/2005 | Bathiche |
| 2005/0057521 A1 | 3/2005 | Aull et al. |
| 2005/0059441 A1 | 3/2005 | Miyashita |
| 2005/0059489 A1 | 3/2005 | Kim |
| 2005/0146512 A1 | 7/2005 | Hill et al. |
| 2005/0190159 A1 | 9/2005 | Skarine |
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2005/0285703 A1 | 12/2005 | Wheeler et al. |
| 2006/0020903 A1 | 1/2006 | Wang et al. |
| 2006/0028095 A1 | 2/2006 | Maruyama et al. |
| 2006/0049993 A1 | 3/2006 | Lin et al. |
| 2006/0082973 A1 | 4/2006 | Egbert et al. |
| 2006/0085658 A1 | 4/2006 | Allen et al. |
| 2006/0102914 A1 | 5/2006 | Smits et al. |
| 2006/0103633 A1 | 5/2006 | Gioeli |
| 2006/0125799 A1 | 6/2006 | Hillis et al. |
| 2006/0132423 A1 | 6/2006 | Travis |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0181521 A1 | 8/2006 | Perreault et al. |
| 2006/0187216 A1 | 8/2006 | Trent, Jr. et al. |
| 2006/0195522 A1 | 8/2006 | Miyazaki |
| 2006/0197753 A1 | 9/2006 | Hotelling |
| 2006/0197754 A1 | 9/2006 | Keely |
| 2006/0197755 A1 | 9/2006 | Bawany |
| 2006/0238510 A1 | 10/2006 | Panotopoulos et al. |
| 2006/0248597 A1 | 11/2006 | Keneman |
| 2007/0043725 A1 | 2/2007 | Hotelling et al. |
| 2007/0047221 A1 | 3/2007 | Park |
| 2007/0051792 A1 | 3/2007 | Wheeler et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0152983 A1 | 7/2007 | McKillop et al. |
| 2007/0182663 A1 | 8/2007 | Biech |
| 2007/0182722 A1 | 8/2007 | Hotelling et al. |
| 2007/0200830 A1 | 8/2007 | Yamamoto |
| 2007/0205995 A1 | 9/2007 | Woolley |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236472 A1 | 10/2007 | Bentsen |
| 2007/0236475 A1 | 10/2007 | Wherry |
| 2007/0247338 A1 | 10/2007 | Marchetto |
| 2007/0247432 A1 | 10/2007 | Oakley |
| 2007/0257821 A1 | 11/2007 | Son et al. |
| 2007/0260892 A1 | 11/2007 | Paul et al. |
| 2007/0274094 A1 | 11/2007 | Schultz et al. |
| 2007/0274095 A1 | 11/2007 | Destain |
| 2007/0283179 A1 | 12/2007 | Burnett et al. |
| 2008/0005423 A1 | 1/2008 | Jacobs et al. |
| 2008/0013809 A1 | 1/2008 | Zhu et al. |
| 2008/0018611 A1 | 1/2008 | Serban et al. |
| 2008/0024459 A1 | 1/2008 | Poupyrev et al. |
| 2008/0042994 A1 | 2/2008 | Gillespie et al. |
| 2008/0094367 A1 | 4/2008 | Van De Ven et al. |
| 2008/0104437 A1 | 5/2008 | Lee |
| 2008/0151478 A1 | 6/2008 | Chern |
| 2008/0158185 A1 | 7/2008 | Westerman |
| 2008/0167832 A1 | 7/2008 | Soss |
| 2008/0180411 A1 | 7/2008 | Solomon et al. |
| 2008/0202824 A1 | 8/2008 | Philipp et al. |
| 2008/0219025 A1 | 9/2008 | Spitzer et al. |
| 2008/0228969 A1 | 9/2008 | Cheah et al. |
| 2008/0232061 A1 | 9/2008 | Wang et al. |
| 2008/0238884 A1 | 10/2008 | Harish |
| 2008/0253822 A1 | 10/2008 | Matias |
| 2008/0297878 A1 | 12/2008 | Brown et al. |

(56) References Cited

U.S. PATENT DOCUMENTS

| | | |
|---|---|---|
| 2008/0303646 A1 | 12/2008 | Elwell et al. |
| 2008/0309636 A1 | 12/2008 | Feng et al. |
| 2008/0316002 A1 | 12/2008 | Brunet et al. |
| 2008/0316066 A1 | 12/2008 | Minato et al. |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0085878 A1 | 4/2009 | Heubel et al. |
| 2009/0090568 A1 | 4/2009 | Min |
| 2009/0101417 A1 | 4/2009 | Suzuki et al. |
| 2009/0106655 A1 | 4/2009 | Grant et al. |
| 2009/0117955 A1 | 5/2009 | Lo |
| 2009/0127005 A1 | 5/2009 | Zachut et al. |
| 2009/0128374 A1 | 5/2009 | Reynolds |
| 2009/0135142 A1 | 5/2009 | Fu et al. |
| 2009/0140985 A1 | 6/2009 | Liu |
| 2009/0160529 A1 | 6/2009 | Lamborghini |
| 2009/0163147 A1 | 6/2009 | Steigerwald et al. |
| 2009/0167704 A1 | 7/2009 | Terlizzi et al. |
| 2009/0174679 A1 | 7/2009 | Westerman |
| 2009/0182901 A1 | 7/2009 | Callaghan et al. |
| 2009/0195497 A1 | 8/2009 | Fitzgerald et al. |
| 2009/0219250 A1 | 9/2009 | Ure |
| 2009/0231019 A1 | 9/2009 | Yeh |
| 2009/0231275 A1 | 9/2009 | Odgers |
| 2009/0250267 A1 | 10/2009 | Heubel et al. |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0267892 A1 | 10/2009 | Faubert |
| 2009/0284397 A1 | 11/2009 | Lee et al. |
| 2009/0295739 A1 | 12/2009 | Nagara et al. |
| 2009/0303137 A1 | 12/2009 | Kusaka et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0013613 A1 | 1/2010 | Weston |
| 2010/0026656 A1 | 2/2010 | Hotelling et al. |
| 2010/0038821 A1 | 2/2010 | Jenkins et al. |
| 2010/0039764 A1 | 2/2010 | Locker et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053087 A1 | 3/2010 | Dai et al. |
| 2010/0053534 A1 | 3/2010 | Hsieh et al. |
| 2010/0075517 A1 | 3/2010 | Ni et al. |
| 2010/0077237 A1 | 3/2010 | Sawyers |
| 2010/0079398 A1 | 4/2010 | Shen et al. |
| 2010/0081377 A1 | 4/2010 | Chatterjee et al. |
| 2010/0085321 A1 | 4/2010 | Pundsack |
| 2010/0097198 A1 | 4/2010 | Suzuki |
| 2010/0102182 A1 | 4/2010 | Lin |
| 2010/0103112 A1 | 4/2010 | Yoo et al. |
| 2010/0103131 A1 | 4/2010 | Segal et al. |
| 2010/0123686 A1 | 5/2010 | Klinghult et al. |
| 2010/0133398 A1 | 6/2010 | Chiu et al. |
| 2010/0137033 A1 | 6/2010 | Lee |
| 2010/0141588 A1 | 6/2010 | Kimura et al. |
| 2010/0142130 A1 | 6/2010 | Wang et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0162109 A1 | 6/2010 | Chatterjee et al. |
| 2010/0162179 A1 | 6/2010 | Porat |
| 2010/0164857 A1 | 7/2010 | Liu et al. |
| 2010/0171708 A1 | 7/2010 | Chuang |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0182263 A1 | 7/2010 | Aunio et al. |
| 2010/0188299 A1 | 7/2010 | Rinehart et al. |
| 2010/0188338 A1 | 7/2010 | Longe |
| 2010/0206614 A1 | 8/2010 | Park et al. |
| 2010/0206644 A1 | 8/2010 | Yeh |
| 2010/0214239 A1 | 8/2010 | Wu et al. |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0238075 A1 | 9/2010 | Pourseyed |
| 2010/0238119 A1 | 9/2010 | Dubrovsky et al. |
| 2010/0238138 A1 | 9/2010 | Goertz et al. |
| 2010/0245221 A1 | 9/2010 | Khan |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0289508 A1 | 11/2010 | Joguet et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315267 A1 | 12/2010 | Chung |
| 2010/0315348 A1 | 12/2010 | Jellicoe et al. |
| 2010/0315373 A1 | 12/2010 | Steinhauser et al. |
| 2010/0321299 A1 | 12/2010 | Shelley et al. |
| 2010/0321301 A1 | 12/2010 | Casparian et al. |
| 2010/0321330 A1 | 12/2010 | Lim et al. |
| 2010/0321339 A1 | 12/2010 | Kimmel |
| 2010/0325155 A1 | 12/2010 | Skinner et al. |
| 2010/0328230 A1 | 12/2010 | Faubert et al. |
| 2010/0331059 A1 | 12/2010 | Apgar et al. |
| 2011/0007008 A1 | 1/2011 | Algreatly |
| 2011/0012873 A1 | 1/2011 | Prest et al. |
| 2011/0018556 A1 | 1/2011 | Le et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043454 A1 | 2/2011 | Modarres et al. |
| 2011/0043990 A1 | 2/2011 | Mickey et al. |
| 2011/0049094 A1 | 3/2011 | Wu |
| 2011/0050037 A1 | 3/2011 | Rinner et al. |
| 2011/0050587 A1 | 3/2011 | Natanzon et al. |
| 2011/0050630 A1 | 3/2011 | Ikeda |
| 2011/0055407 A1 | 3/2011 | Lydon et al. |
| 2011/0057899 A1 | 3/2011 | Sleeman et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0074702 A1 | 3/2011 | Pertuit et al. |
| 2011/0080347 A1 | 4/2011 | Steeves et al. |
| 2011/0080367 A1 | 4/2011 | Marchand et al. |
| 2011/0084909 A1 | 4/2011 | Hsieh et al. |
| 2011/0095994 A1 | 4/2011 | Birnbaum |
| 2011/0096513 A1 | 4/2011 | Kim |
| 2011/0102326 A1 | 5/2011 | Casparian et al. |
| 2011/0102356 A1 | 5/2011 | Kemppinen et al. |
| 2011/0115712 A1 | 5/2011 | Han et al. |
| 2011/0115747 A1 | 5/2011 | Powell et al. |
| 2011/0118025 A1 | 5/2011 | Lukas et al. |
| 2011/0128227 A1 | 6/2011 | Theimer |
| 2011/0134032 A1 | 6/2011 | Chiu et al. |
| 2011/0134112 A1 | 6/2011 | Koh et al. |
| 2011/0141052 A1 | 6/2011 | Bernstein |
| 2011/0147398 A1 | 6/2011 | Ahee et al. |
| 2011/0148793 A1 | 6/2011 | Ciesla et al. |
| 2011/0157087 A1 | 6/2011 | Kanehira et al. |

(56) References Cited

U.S. PATENT DOCUMENTS

| | | |
|---|---|---|
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205161 A1 | 8/2011 | Myers et al. |
| 2011/0205372 A1 | 8/2011 | Miramontes |
| 2011/0216266 A1 | 9/2011 | Travis |
| 2011/0227872 A1 | 9/2011 | Huska et al. |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0241999 A1 | 10/2011 | Thier |
| 2011/0242138 A1 | 10/2011 | Tribble |
| 2011/0248152 A1 | 10/2011 | Svajda et al. |
| 2011/0248920 A1 | 10/2011 | Larsen |
| 2011/0248930 A1 | 10/2011 | Kwok et al. |
| 2011/0248941 A1 | 10/2011 | Abdo et al. |
| 2011/0261001 A1 | 10/2011 | Liu |
| 2011/0261021 A1 | 10/2011 | Modarres et al. |
| 2011/0261083 A1 | 10/2011 | Wilson |
| 2011/0267294 A1 | 11/2011 | Kildal |
| 2011/0267300 A1 | 11/2011 | Serban et al. |
| 2011/0267757 A1 | 11/2011 | Probst |
| 2011/0290686 A1 | 12/2011 | Huang |
| 2011/0291922 A1 | 12/2011 | Stewart et al. |
| 2011/0291951 A1 | 12/2011 | Tong |
| 2011/0295697 A1 | 12/2011 | Boston et al. |
| 2011/0297566 A1 | 12/2011 | Gallagher et al. |
| 2011/0304577 A1 | 12/2011 | Brown et al. |
| 2011/0304962 A1 | 12/2011 | Su |
| 2011/0306424 A1 | 12/2011 | Kazama et al. |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0013519 A1 | 1/2012 | Hakansson et al. |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0055770 A1 | 3/2012 | Chen |
| 2012/0068933 A1 | 3/2012 | Larsen |
| 2012/0068957 A1 | 3/2012 | Puskarich et al. |
| 2012/0072167 A1 | 3/2012 | Cretella, Jr. et al. |
| 2012/0075198 A1 | 3/2012 | Sulem et al. |
| 2012/0075221 A1 | 3/2012 | Yasuda |
| 2012/0075249 A1 | 3/2012 | Hoch |
| 2012/0081316 A1 | 4/2012 | Sirpal et al. |
| 2012/0087078 A1 | 4/2012 | Medica et al. |
| 2012/0092279 A1 | 4/2012 | Martin |
| 2012/0092350 A1 | 4/2012 | Ganapathi et al. |
| 2012/0094257 A1 | 4/2012 | Pillischer et al. |
| 2012/0098751 A1 | 4/2012 | Lin |
| 2012/0099263 A1 | 4/2012 | Lin |
| 2012/0099749 A1 | 4/2012 | Rubin et al. |
| 2012/0105481 A1 | 5/2012 | Baek et al. |
| 2012/0106082 A1 | 5/2012 | Wu et al. |
| 2012/0113579 A1 | 5/2012 | Agata et al. |
| 2012/0115553 A1 | 5/2012 | Mahe et al. |
| 2012/0117409 A1 | 5/2012 | Lee et al. |
| 2012/0127071 A1 | 5/2012 | Jitkoff et al. |
| 2012/0127118 A1 | 5/2012 | Nolting et al. |
| 2012/0139844 A1 | 6/2012 | Ramstein et al. |
| 2012/0140396 A1 | 6/2012 | Zeliff et al. |
| 2012/0145525 A1 | 6/2012 | Ishikawa |
| 2012/0155015 A1 | 6/2012 | Govindasamy et al. |
| 2012/0162693 A1 | 6/2012 | Ito |
| 2012/0175487 A1 | 7/2012 | Goto |
| 2012/0182242 A1 | 7/2012 | Lindahl et al. |
| 2012/0188180 A1 | 7/2012 | Yang et al. |
| 2012/0194393 A1 | 8/2012 | Uttermann et al. |
| 2012/0194448 A1 | 8/2012 | Rothkopf |
| 2012/0200532 A1 | 8/2012 | Powell et al. |
| 2012/0200802 A1 | 8/2012 | Large |
| 2012/0206401 A1 | 8/2012 | Lin et al. |
| 2012/0206937 A1 | 8/2012 | Travis et al. |
| 2012/0223866 A1 | 9/2012 | Ayala Vazquez et al. |
| 2012/0224073 A1 | 9/2012 | Miyahara |
| 2012/0229401 A1 | 9/2012 | Birnbaum et al. |
| 2012/0235635 A1 | 9/2012 | Sato |
| 2012/0235921 A1 | 9/2012 | Laubach |
| 2012/0235942 A1 | 9/2012 | Shahoian et al. |
| 2012/0242588 A1 | 9/2012 | Myers et al. |
| 2012/0246377 A1 | 9/2012 | Bhesania |
| 2012/0249459 A1 | 10/2012 | Sashida et al. |
| 2012/0249474 A1 | 10/2012 | Pratt et al. |
| 2012/0256848 A1 | 10/2012 | Madabusi Srinivasan |
| 2012/0256959 A1 | 10/2012 | Ye et al. |
| 2012/0268412 A1 | 10/2012 | Cruz-Hernandez et al. |
| 2012/0268911 A1 | 10/2012 | Lin |
| 2012/0274578 A1 | 11/2012 | Snow et al. |
| 2012/0274811 A1 | 11/2012 | Bakin |
| 2012/0287562 A1 | 11/2012 | Wu et al. |
| 2012/0299866 A1 | 11/2012 | Pao et al. |
| 2012/0300275 A1 | 11/2012 | Vilardell et al. |
| 2012/0304199 A1 | 11/2012 | Homma et al. |
| 2012/0312955 A1 | 12/2012 | Randolph |
| 2012/0327025 A1 | 12/2012 | Huska et al. |
| 2012/0328349 A1 | 12/2012 | Isaac et al. |
| 2013/0009892 A1 | 1/2013 | Salmela et al. |
| 2013/0044059 A1 | 2/2013 | Fu |
| 2013/0047747 A1 | 2/2013 | Joung |
| 2013/0063364 A1 | 3/2013 | Moore |
| 2013/0063873 A1 | 3/2013 | Wodrich et al. |
| 2013/0076646 A1 | 3/2013 | Krah et al. |
| 2013/0076652 A1 | 3/2013 | Leung |
| 2013/0088431 A1 | 4/2013 | Ballagas et al. |
| 2013/0088442 A1 | 4/2013 | Lee |
| 2013/0094131 A1 | 4/2013 | O'Donnell et al. |
| 2013/0097534 A1 | 4/2013 | Lewin et al. |
| 2013/0106766 A1 | 5/2013 | Yilmaz et al. |
| 2013/0107144 A1 | 5/2013 | Marhefka et al. |
| 2013/0127735 A1 | 5/2013 | Motoyama |
| 2013/0141370 A1 | 6/2013 | Wang et al. |
| 2013/0167663 A1 | 7/2013 | Eventoff |
| 2013/0194235 A1 | 8/2013 | Zanone et al. |
| 2013/0201115 A1 | 8/2013 | Heubel |
| 2013/0207917 A1 | 8/2013 | Cruz-Hernandez et al. |
| 2013/0222286 A1 | 8/2013 | Kang et al. |
| 2013/0227836 A1 | 9/2013 | Whitt, III |
| 2013/0228433 A1 | 9/2013 | Shaw |
| 2013/0229273 A1 | 9/2013 | Nodar Cortizo et al. |
| 2013/0229356 A1 | 9/2013 | Marwah et al. |
| 2013/0229386 A1 | 9/2013 | Bathiche |
| 2013/0249802 A1 | 9/2013 | Yasutake |
| 2013/0275058 A1 | 10/2013 | Awad |
| 2013/0278552 A1 | 10/2013 | Kamin-Lyndgaard |
| 2013/0300683 A1 | 11/2013 | Birnbaum et al. |
| 2013/0304941 A1 | 11/2013 | Drasnin |
| 2013/0304944 A1 | 11/2013 | Young |
| 2013/0311881 A1 | 11/2013 | Birnbaum et al. |
| 2013/0314341 A1 | 11/2013 | Lee et al. |
| 2013/0321291 A1 | 12/2013 | Sim |
| 2013/0335209 A1 | 12/2013 | Cruz-Hernandez et al. |
| 2013/0335330 A1 | 12/2013 | Lane |
| 2013/0335902 A1 | 12/2013 | Campbell |
| 2013/0335903 A1 | 12/2013 | Raken |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0009429 A1 | 1/2014 | Verweg et al. |
| 2014/0020484 A1 | 1/2014 | Shaw et al. |
| 2014/0022177 A1 | 1/2014 | Shaw |
| 2014/0028624 A1 | 1/2014 | Marsden et al. |
| 2014/0055375 A1 | 2/2014 | Kim et al. |
| 2014/0083207 A1 | 3/2014 | Eventoff |

(56) References Cited

U.S. PATENT DOCUMENTS

| | | | |
|---|---|---|---|
| 2014/0092003 A1* | 4/2014 | Liu | G06F 3/016 345/156 |
| 2014/0098058 A1 | 4/2014 | Baharav et al. | |
| 2014/0104189 A1 | 4/2014 | Marshall et al. | |
| 2014/0139436 A1 | 5/2014 | Ramstein et al. | |
| 2014/0139452 A1* | 5/2014 | Levesque | G06F 3/0414 345/173 |
| 2014/0139472 A1 | 5/2014 | Takenaka | |
| 2014/0198072 A1 | 7/2014 | Schuele et al. | |
| 2014/0210742 A1 | 7/2014 | Delattre et al. | |
| 2014/0221098 A1 | 8/2014 | Boulanger | |
| 2014/0225821 A1 | 8/2014 | Kim et al. | |
| 2014/0225857 A1 | 8/2014 | Ma | |
| 2014/0230575 A1 | 8/2014 | Picciotto et al. | |
| 2014/0232657 A1 | 8/2014 | Aviles et al. | |
| 2014/0232679 A1 | 8/2014 | Whitman et al. | |
| 2014/0306914 A1 | 10/2014 | Kagayama | |
| 2014/0320393 A1 | 10/2014 | Modarres et al. | |
| 2014/0354587 A1 | 12/2014 | Mohindra et al. | |
| 2014/0370937 A1 | 12/2014 | Park et al. | |
| 2015/0084865 A1 | 3/2015 | Shaw et al. | |
| 2015/0097786 A1 | 4/2015 | Behles et al. | |
| 2015/0116205 A1 | 4/2015 | Westerman et al. | |
| 2015/0185842 A1 | 7/2015 | Picciotto et al. | |
| 2015/0185950 A1 | 7/2015 | Watanabe et al. | |
| 2015/0227207 A1 | 8/2015 | Winter et al. | |
| 2015/0253872 A1 | 9/2015 | Reyes | |
| 2015/0293592 A1 | 10/2015 | Cheong et al. | |
| 2015/0370376 A1 | 12/2015 | Harley et al. | |
| 2016/0018894 A1 | 1/2016 | Yliaho et al. | |
| 2016/0063828 A1* | 3/2016 | Moussette | G08B 6/00 340/540 |
| 2016/0135742 A1* | 5/2016 | Cobbett | A61B 5/0205 224/249 |
| 2017/0023418 A1 | 1/2017 | Shaw et al. | |
| 2017/0102770 A1 | 4/2017 | Winter et al. | |

FOREIGN PATENT DOCUMENTS

| | | |
|---|---|---|
| EP | 1223722 | 7/2002 |
| EP | 1591891 | 11/2005 |
| EP | 2353978 | 8/2011 |
| EP | 2381340 | 10/2011 |
| EP | 2584432 | 4/2013 |
| GB | 2178570 | 2/1987 |
| JP | 10326124 | 12/1998 |
| JP | 1173239 | 3/1999 |
| JP | 11345041 | 12/1999 |
| KR | 1020110087178 | 8/2011 |
| NL | 1038411 | 5/2012 |
| WO | WO-2010011983 | 1/2010 |
| WO | WO-2012036717 | 3/2012 |
| WO | WO-2012173305 | 12/2012 |
| WO | WO-2013169299 | 11/2013 |
| WO | WO-2014098946 | 6/2014 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Advanced Configuration and Power Management Specification", Intel Corporation, Microsoft Corporation, Toshiba Corp. Revision 1, Dec. 22, 1996, 364 pages.

"Capacitive Touch Sensors—Application Fields, Technology Overview and Implementation Example", Fujitsu Microelectronics Europe GmbH; retrieved from http://www.fujitsu.com/downloads/MICRO/fme/articles/fujitsu-whitepaper-capacitive-touch-sensors.pdf on Jul. 20, 2011, Jan. 12, 2010, 12 pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, dated Apr. 9, 2013, 2 pages.

"Corrected Notice of Allowance", U.S. Appl. No. 13/470,633, dated Jul. 2, 2013, 2 pages.

"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>, Aug. 30, 2010, pp. 1-10.

"Directional Backlighting for Display Panels", U.S. Appl. No. 13/021,448, filed Feb. 4, 2011, 38 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.

"Ex Parte Quayle Action", U.S. Appl. No. 13/599,763, filed Nov. 14, 2014, 6 pages.

"Final Office Action", U.S. Appl. No. 13/471,001, dated Jul. 25, 2013, 20 pages.

"Final Office Action", U.S. Appl. No. 13/527,263, dated Jan. 27, 2015, 7 pages.

"Final Office Action", U.S. Appl. No. 13/603,918, dated Mar. 21, 2014, 14 pages.

"Final Office Action", U.S. Appl. No. 13/647,479, dated Dec. 12, 2014, 12 pages.

"Final Office Action", U.S. Appl. No. 13/651,195, dated Apr. 18, 2013, 13 pages.

"Final Office Action", U.S. Appl. No. 13/651,232, dated May 21, 2013, 21 pages.

"Final Office Action", U.S. Appl. No. 13/651,287, dated May 3, 2013, 16 pages.

"Final Office Action", U.S. Appl. No. 13/651,976, dated Jul. 25, 2013, 21 pages.

"Final Office Action", U.S. Appl. No. 13/653,321, dated Aug. 2, 2013, 17 pages.

"Final Office Action", U.S. Appl. No. 13/655,065, dated Apr. 2, 2015, 23 pages.

"Final Office Action", U.S. Appl. No. 13/655,065, dated Aug. 8, 2014, 20 pages.

"Final Office Action", U.S. Appl. No. 13/769,356, dated Apr. 10, 2015, 9 pages.

"Final Office Action", U.S. Appl. No. 13/782,137, dated May 8, 2015, 19 pages.

"Final Office Action", U.S. Appl. No. 13/974,749, dated May 21, 2015, 19 pages.

"Final Office Action", U.S. Appl. No. 13/974,749, dated Sep. 5, 2014, 18 pages.

"Final Office Action", U.S. Appl. No. 13/974,994, dated Jun. 10, 2015, 28 pages.

"Final Office Action", U.S. Appl. No. 13/974,994, dated Oct. 6, 2014, 26 pages.

"Final Office Action", U.S. Appl. No. 13/975,087, dated Aug. 7, 2015, 16 pages.

"Final Office Action", U.S. Appl. No. 13/975,087, dated Sep. 10, 2014, 19 pages.

"Final Office Action", U.S. Appl. No. 14/033,510, dated Jun. 5, 2015, 24 pages.

"Final Office Action", U.S. Appl. No. 14/033,510, dated Aug. 21, 2014, 18 pages.

"First One Handed Fabric Keyboard with Bluetooth Wireless Technology", Retrieved from: <http://press.xtvworld.com/article3817.html> on May 8, 2012, Jan. 6, 2005, 2 pages.

"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.

"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.

(56) References Cited

OTHER PUBLICATIONS

"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.

"iControlPad 2—The open source controller", Retrieved from <http://www.kickstarter.com/projects/1703567677/icontrolpad-2-the-open-source-controller> on Nov. 20, 2012, 2012, 15 pages.

"i-Interactor electronic pen", Retrieved from: <http://www.alibaba.com/product-gs/331004878/i_Interactor_electronic_pen.html> on Jun. 19, 2012, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.

"International Search Report and Written Opinion", Application No. PCT/US2014/068687, dated Mar. 18, 2015, 10 pages.

"International Search Report and Written Opinion", Application No. PCT/US2014/016151, dated May 16, 2014, 10 pages.

"International Search Report and Written Opinion", Application No. PCT/US2014/016743, dated Jul. 24, 2014, 10 pages.

"International Search Report and Written Opinion", Application No. PCT/US2014/056185, dated Dec. 4, 2014, 10 pages.

"International Search Report and Written Opinion", Application No. PCT/US2013/028948, dated Jun. 21, 2013, 11 pages.

"International Search Report and Written Opinion", Application No. PCT/US2013/029461, dated Jun. 21, 2013, 11 pages.

"International Search Report and Written Opinion", Application No. PCT/US2013/040968, dated Sep. 5, 2013, 11 pages.

"International Search Report and Written Opinion", Application No. PCT/US2013/044871, dated Aug. 14, 2013, 12 pages.

"International Search Report and Written Opinion", Application No. PCT/US2014/014522, dated Jun. 6, 2014, 13 pages.

"International Search Report and Written Opinion", Application No. PCT/US2013/045283, dated Mar. 12, 2014, 19 pages.

"International Search Report and Written Opinion", Application No. PCT/US2013/044873, dated Nov. 22, 2013, 9 pages.

"International Search Report and Written Opinion", Application No. PCT/US2013/045049, dated Sep. 16, 2013, 9 pages.

"Membrane Keyboards & Membrane Keypads", Retrieved from: <http://www.pannam.com/> on May 9, 2012, Mar. 4, 2009, 2 pages.

"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.

"Motion Sensors", Android Developers—retrieved from <http://developer.android.com/guide/topics/sensors/sensors_motion.html> on May 25, 2012, 2012, 7 pages.

"MPC Fly Music Production Controller", AKAI Professional, Retrieved from: <http://www.akaiprompc.com/mpc-fly> on Jul. 9, 2012, 4 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/021,448, dated Dec. 13, 2012, 9 pages.

"Non-Final Office Action", U.S. Appl. No. 13/471,001, dated Feb. 19, 2013, 15 pages.

"Non-Final Office Action", U.S. Appl. No. 13/471,139, dated Mar. 21, 2013, 12 pages.

"Non-Final Office Action", U.S. Appl. No. 13/471,202, dated Feb. 11, 2013, 10 pages.

"Non-Final Office Action", U.S. Appl. No. 13/471,336, dated Jan. 18, 2013, 14 pages.

"Non-Final Office Action", U.S. Appl. No. 13/527,263, dated Apr. 3, 2014, 6 pages.

"Non-Final Office Action", U.S. Appl. No. 13/527,263, dated Jul. 19, 2013, 5 pages.

"Non-Final Office Action", U.S. Appl. No. 13/563,435, dated Jun. 14, 2013, 6 pages.

"Non-Final Office Action", U.S. Appl. No. 13/564,520, dated Jun. 19, 2013, 8 pages.

"Non-Final Office Action", U.S. Appl. No. 13/565,124, dated Jun. 17, 2013, 5 pages.

"Non-Final Office Action", U.S. Appl. No. 13/599,763, dated May 28, 2014, 6 pages.

"Non-Final Office Action", U.S. Appl. No. 13/603,918, dated Sep. 2, 2014, 13 pages.

"Non-Final Office Action", U.S. Appl. No. 13/603,918, dated Dec. 19, 2013, 12 pages.

"Non-Final Office Action", U.S. Appl. No. 13/645,405, dated Jan. 31, 2014, 6 pages.

"Non-Final Office Action", U.S. Appl. No. 13/645,405, dated Aug. 11, 2014, 5 pages.

"Non-Final Office Action", U.S. Appl. No. 13/647,479, dated Jul. 3, 2014, 10 pages.

"Non-Final Office Action", U.S. Appl. No. 13/651,195, dated Jan. 2, 2013, 14 pages.

"Non-Final Office Action", U.S. Appl. No. 13/651,232, dated Jan. 17, 2013, 15 pages.

"Non-Final Office Action", U.S. Appl. No. 13/651,272, dated Feb. 12, 2013, 10 pages.

"Non-Final Office Action", U.S. Appl. No. 13/651,287, dated Jan. 29, 2013, 13 pages.

"Non-Final Office Action", U.S. Appl. No. 13/651,304, dated Mar. 22, 2013, 9 pages.

"Non-Final Office Action", U.S. Appl. No. 13/651,327, dated Mar. 22, 2013, 6 pages.

"Non-Final Office Action", U.S. Appl. No. 13/651,726, dated Apr. 15, 2013, 6 pages.

"Non-Final Office Action", U.S. Appl. No. 13/651,871, dated Mar. 18, 2013, 14 pages.

"Non-Final Office Action", U.S. Appl. No. 13/651,871, dated Jul. 1, 2013, 5 pages.

"Non-Final Office Action", U.S. Appl. No. 13/651,976, dated Feb. 22, 2013, 16 pages.

"Non-Final Office Action", U.S. Appl. No. 13/653,321, dated Feb. 1, 2013, 13 pages.

"Non-Final Office Action", U.S. Appl. No. 13/653,682, dated Feb. 7, 2013, 11 pages.

"Non-Final Office Action", U.S. Appl. No. 13/653,682, dated Jun. 3, 2013, 14 pages.

"Non-Final Office Action", U.S. Appl. No. 13/655,065, dated Apr. 24, 2014, 16 pages.

"Non-Final Office Action", U.S. Appl. No. 13/655,065, dated Aug. 19, 2015, 18 pages.

"Non-Final Office Action", U.S. Appl. No. 13/655,065, dated Dec. 19, 2014, 24 pages.

"Non-Final Office Action", U.S. Appl. No. 13/656,055, dated Apr. 23, 2013, 11 pages.

"Non-Final Office Action", U.S. Appl. No. 13/656,520, dated Feb. 1, 2013, 15 pages.

"Non-Final Office Action", U.S. Appl. No. 13/656,520, dated Jun. 5, 2013, 8 pages.

"Non-Final Office Action", U.S. Appl. No. 13/759,875, dated Aug. 1, 2014, 16 pages.

"Non-Final Office Action", U.S. Appl. No. 13/769,356, dated Oct. 19, 2015, 23 pages.

"Non-Final Office Action", U.S. Appl. No. 13/769,356, dated Nov. 20, 2014, 16 pages.

"Non-Final Office Action", U.S. Appl. No. 13/782,137, dated Jan. 30, 2015, 12 pages.

"Non-Final Office Action", U.S. Appl. No. 13/782,137, dated Oct. 6, 2015, 20 pages.

"Non-Final Office Action", U.S. Appl. No. 13/974,749, dated Feb. 12, 2015, 15 pages.

"Non-Final Office Action", U.S. Appl. No. 13/974,749, dated May 8, 2014, 16 pages.

"Non-Final Office Action", U.S. Appl. No. 13/974,994, dated Jan. 23, 2015, 26 pages.

"Non-Final Office Action", U.S. Appl. No. 13/974,994, dated Jun. 4, 2014, 24 pages.

"Non-Final Office Action", U.S. Appl. No. 13/975,087, dated Feb. 27, 2015, 20 pages.

(56) References Cited

OTHER PUBLICATIONS

"Non-Final Office Action", U.S. Appl. No. 13/975,087, dated May 8, 2014, 18 pages.
"Non-Final Office Action", U.S. Appl. No. 14/033,510, dated Feb. 12, 2015, 17 pages.
"Non-Final Office Action", U.S. Appl. No. 14/033,510, dated Jun. 5, 2014, 16 pages.
"Non-Final Office Action", U.S. Appl. No. 14/144,876, dated Jun. 10, 2015, 23 pages.
"Notice of Allowance", U.S. Appl. No. 13/470,633, dated Mar. 22, 2013, 7 pages.
"Notice of Allowance", U.S. Appl. No. 13/471,202, dated May 28, 2013, 7 pages.
"Notice of Allowance", U.S. Appl. No. 13/599,763, dated Feb. 18, 2015, 4 pages.
"Notice of Allowance", U.S. Appl. No. 13/603,918, dated Jan. 22, 2015, 8 pages.
"Notice of Allowance", U.S. Appl. No. 13/651,195, dated Jul. 8, 2013, 9 pages.
"Notice of Allowance", U.S. Appl. No. 13/651,272, dated May 2, 2013, 7 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>, Nov. 2010, pp. 1-13.
"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010, Jan. 1, 2010, 3 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/603,918, dated Nov. 27, 2013, 8 pages.
"Restriction Requirement", U.S. Appl. No. 13/471,139, dated Jan. 17, 2013, 7 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 13/715,229, dated Aug. 13, 2013, 7 pages.
"Second Written Opinion", Application No. PCT/US2014/068687, dated Nov. 12, 2015, 6 pages.
"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"Snugg iPad 3 Keyboard Case—Cover Ultra Slim Bluetooth Keyboard Case for the iPad 3 & iPad 2", Retrieved from <https://web.archive.org/web/20120810202056/http://www.amazon.com/Snugg-iPad-Keyboard-Case-Bluetooth/dp/B008CCHXJE> on Jan. 23, 2015, Aug. 10, 2012, 4 pages.
"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012, 2011, 4 pages.
"Tactile Feedback Solutions Using Piezoelectric Actuators", Available at: http://www.eetimes.com/document.asp?doc_id=1278418, Nov. 17, 2010, 6 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Visus Photonics—Visionary Technologies New Generation of Production Ready Keyboard-Keypad Illumination Systems", Available at: <http://www.visusphotonics.com/pdf/appl_keypad_keyboard_backlights.pdf>, May 2006, pp. 1-22.
"What is Active Alignment?", http://www.kasalis.com/active_alignment.html, retrieved on Nov. 22, 2012, Nov. 22, 2012, 2 Pages.
"Write & Learn Spellboard Advanced", Available at <http://somemanuals.com/VTECH,WRITE%2526LEARN—SPELLBOARD—ADV—71000,JIDFHE.PDF>, 2006, 22 pages.
"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.
Akamatsu,"Movement Characteristics Using a Mouse with Tactile and Force Feedback", In Proceedings of International Journal of Human-Computer Studies 45, No. 4, Oct. 1996, 11 pages.
Bathiche,"Input Device with Interchangeable Surface", U.S. Appl. No. 13/974,749, Aug. 23, 2013, 51 pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.
Chu,"Design and Analysis of a Piezoelectric Material Based Touch Screen With Additional Pressure and Its Acceleration Measurement Functions", In Proceedings of Smart Materials and Structures, vol. 22, Issue 12, Nov. 1, 2013, 2 pages.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.
Gaver,"A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012, May 7, 1995, 9 pages.
Glatt,"Channel and Key Pressure (Aftertouch).", Retrieved from: <http://home.roadrunner.com/~jgglatt/tutr/touch.htm> on Jun. 11, 2012, 2012, 2 pages.

(56) References Cited

OTHER PUBLICATIONS

Gong,"PrintSense: A Versatile Sensing Technique to Support Multimodal Flexible Surface Interaction", In Proceedings of the SIGCHI Conference on Human Factors in Computing Systems; retrieved from: http://dl.acm.org/citation.cfm?id=2556288.2557173 &coll=DL&dl=ACM&CFID=571580473 &CFTOKEN=89752233 on Sep. 19, 2014, Apr. 26, 2014, 4 pages.

Hanlon,"ElekTex Smart Fabric Keyboard Goes Wireless", Retrieved from: <http://www.gizmag.com/go/5048/ > on May 7, 2012, Jan. 15, 2006, 5 pages.

Harada,"VoiceDraw: A Hands-Free Voice-Driven Drawing Application for People With Motor Impairments", In Proceedings of Ninth International ACM SIGACCESS Conference on Computers and Accessibility, retrieved from <http://citeseerx.ist.psu.edu/ viewdoc/download?doi=10.1.1.113.7211&rep=rep1&type=pdf> on Jun. 1, 2012, Oct. 15, 2007, 8 pages.

Hinckley,"Touch-Sensing Input Devices", In Proceedings of ACM SIGCHI 1999, May 15, 1999, 8 pages.

Hughes,"Apple's haptic touch feedback concept uses actuators, senses force on iPhone, iPad", Retrieved from: http://appleinsider.com/articles/12/03/22/apples_haptic_touch_feedback_concept_uses_actuators_senses_force_on _iphone_ipad, Mar. 22, 2012, 5 pages.

Iwase,"Multistep Sequential Batch Assembly of Three-Dimensional Ferromagnetic Microstructures with Elastic Hinges", Retrieved at <<http://ieeexplore.ieee.org/stamp/stamp.jsp?tp= &arnumber=1549861>> Proceedings: Journal of Microelectromechanical Systems, Dec. 2005, 7 pages.

Kaufmann,"Hand Posture Recognition Using Real-time Artificial Evolution", EvoApplications'09, retrieved from <http://evelyne.lutton.free.fr/Papers/KaufmannEvolASP2010.pdf> on Jan. 5, 2012, Apr. 3, 2010, 10 pages.

Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.

Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.

Kyung,"TAXEL: Initial Progress Toward Self-Morphing Visio-Haptic Interface", Proceedings: In IEEE World Haptics Conference, Jun. 21, 2011, 6 pages.

Lane,"Media Processing Input Device", U.S. Appl. No. 13/655,065, dated Oct. 18, 2012, 43 pages.

Li,"Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>, Feb. 2012, 13 pages.

Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.

Mackenzie,"The Tactile Touchpad", In Proceedings of the ACM CHI Human Factors in Computing Systems Conference Available at: <http://citeseerx.ist.psu.edu/viewdoc/download?doi=10.1.1.150.4780&rep=rep1&type=pdf >, Mar. 22, 1997, 2 pages.

Manresa-Yee,"Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012, Oct. 13, 2008, pp. 261-262.

McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.

McPherson,"TouchKeys: Capacitive Multi-Touch Sensing on a Physical Keyboard", In Proceedings of NIME 2012, May 2012, 4 pages.

Miller,"MOGA gaming controller enhances the Android gaming experience", Retrieved from <http://www.zdnet.com/moga-gaming-controller-enhances-the-android-gaming-experience-7000007550/> on Nov. 20, 2012, Nov. 18, 2012, 9 pages.

Nakanishi,"Movable Cameras Enhance Social Telepresence in Media Spaces", In Proceedings of the 27th International Conference on Human Factors in Computing Systems, retrieved from <http://smg.ams.eng.osaka-u.ac.jp/~nakanishi/hnp_2009_chi.pdf> on Jun. 1, 2012, Apr. 6, 2009, 10 pages.

Picciotto,"Piezo-Actuated Virtual Buttons for Touch Surfaces", U.S. Appl. No. 13/769,356, Feb. 17, 2013, 31 pages.

Piltch,"ASUS Eee Pad Slider SL101 Review", Retrieved from <http://www.laptopmag.com/review/tablets/asus-eee-pad-slider-sl101.aspx>, Sep. 22, 2011, 5 pages.

Post,"E-Broidery: Design and Fabrication of Textile-Based Computing", IBM Systems Journal, vol. 39, Issue 3 & 4, Jul. 2000, pp. 840-860.

Poupyrev,"Ambient Touch: Designing Tactile Interfaces for Handheld Devices", In Proceedings of the 15th Annual ACM Symposium on User Interface Software and Technology Available at: <http://www.ivanpoupyrev.com/e-library/2002/uist2002_ambientouch.pdf>, Oct. 27, 2002, 10 pages.

Poupyrev,"Tactile Interfaces for Small Touch Screens", In Proceedings of the 16th Annual ACM Symposium on User Interface Softward and Technology, Nov. 2, 2003, 4 pages.

Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.

Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.

Reilink,"Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf> on Jun. 1, 2012, Sep. 26, 2010, pp. 510-515.

Rendl,"PyzoFlex: Printed Piezoelectric Pressure Sensing Foil", In Proceedings of the 25th Annual ACM Symposium on User Interface Software and Technology, Oct. 7, 2012, 10 pages.

Rubin,"Switched on: The Bedeviled Bezel", Retrieved from: http://www.engadget.com/2011/07/17/switched-on-the-bedeviled-bezel/—on Nov. 19, 2015, Jul. 17, 2011, 4 pages.

Shaw,"Input Device Configuration having Capacitive and Pressure Sensors", U.S. Appl. No. 14/033,510, Sep. 22, 2013, 55 pages.

Staff,"Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.

Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

Sundstedt,"Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedt.pdf> on Jun. 1, 2012, Jul. 28, 2010, 85 pages.

Takamatsu,"Flexible Fabric Keyboard with Conductive Polymer-Coated Fibers", In Proceedings of Sensors 2011, Oct. 28, 2011, 4 pages.

Titus,"Give Sensors a Gentle Touch", http://www.ecnmag.com/articles/2010/01/give-sensors-gentle-touch, Jan. 13, 2010, 6 pages.

Travis,"Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, Oct. 15, 2009, 6 pages.

(56) References Cited

OTHER PUBLICATIONS

Travis, "The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.
Tuite, "Haptic Feedback Chips Make Virtual-Button Applications on Handheld Devices a Snap", Retrieved at: http://electronicdesign.com/analog/haptic-feedback-chips-make-virtual-button-applications-handheld-devices-snap, Sep. 10, 2009, 7 pages.
Valli, "Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.
Valliath, "Design of Hologram for Brightness Enhancement in Color LCDs", Retrieved from <http://www.loreti.it/Download/PDF/LCD/44_05.pdf> on Sep. 17, 2012, May 1998, 5 pages.
Vaucelle, "Scopemate, A Robotic Microscope!", Architectradure, retrieved from <http://architectradure.blogspot.com/2011/10/atuist-this-monday-scopemate-robotic.html> on Jun. 6, 2012, Oct. 17, 2011, 2 pages.
Williams, "A Fourth Generation of LCD Backlight Technology", Retrieved from <http://cds.linear.com/docs/Application%20Note/an65f.pdf>, Nov. 1995, 124 pages.
Xu, "Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012, Feb. 8, 2009, 5 pages.
Xu, "Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012, Dec. 5, 2009, pp. 223-226.
Zhang, "Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
Zhu, "Keyboard before Head Tracking Depresses User Success in Remote Camera Control", In Proceedings of 12th IFIP TC 13 International Conference on Human-Computer Interaction, Part II, retrieved from<http://csiro.academia.edu/Departments/CSIRO_ICT_Centre/Papers?page=5> on Jun. 1, 2012, Aug. 24, 2009, 14 pages.
"Corrected Notice of Allowance", U.S. Appl. No. 14/698,318, dated Jun. 9, 2016, 2 pages.
"International Search Report and Written Opinion", Application No. PCT/US2016/025966, dated Jun. 15, 2016, 15 pages.
"Non-Final Office Action", U.S. Appl. No. 14/144,876, dated Jul. 6, 2016, 33 pages.
"Notice of Allowance", U.S. Appl. No. 14/698,318, dated May 6, 2016, 13 pages.
"Supplemental Notice of Allowance", U.S. Appl. No. 14/698,318, dated Aug. 15, 2016, 2 pages.
"International Search Report and Written Opinion Issued in PCT Application No. PCT/US2017/013583", dated Apr. 19, 2017, 13 pages.
"Second Written Opinion Issued in PCT Application No. PCT/US2016/025966", dated Mar. 14, 2017, 7 pages.
"Using a Force Touch trackpad", Retrieved on: Nov. 17, 2015 Available at: https://support.apple.com/en-in/HT204352.
Betters, Elyse, "What is Force Touch? Apple's Haptic Feedback Technology Explained", Published on: Mar. 11, 2015 Available at: http://www.pocket-lint.com/news/133176-what-is-force-touch-apple-s-haptic-feedback-technology-explained.
De Rosa, Aurelio, "HTML5: Vibration API", Published on: Mar. 10, 2014 Available at: http://code.tutsplus.com/tutorials/html5-vibration-api-mobile-22585.
Rendl, et al., "Presstures: Exploring Pressure-Sensitive Multi-Touch Gestures on Trackpads", In Proceedings of SIGCHI Conference on Human Factors in Computing Systems, Apr. 26, 2014, pp. 431-434.
Kadlecek, Petr, "Overview of Current Developments in Haptic APIs", In Proceedings of 15th Central European Seminar on Computer Graphics, May 2, 2011, 8 pages.
U.S. Appl. No. 14/298,658, Boulanger, et al., "Method and System for Controlling of an Ambient Multiple Zones Haptic Feedback on Mobile Devices (W231)", filed Jun. 6, 2014.
"Final Office Action", U.S. Appl. No. 14/144,876, dated Feb. 3, 2016, 27 pages.
"International Preliminary Report on Patentability", Application No. PCT/US2014/068687, dated Mar. 11, 2016, 7 pages.
"Non-Final Office Action", U.S. Appl. No. 15/269,594, dated Jun. 7, 2017, 27 pages.
"International Preliminary Report on Patentability", Application No. PCT/US2016/025966, dated May 22, 2017, 8 pages.
"Advisory Action", U.S. Appl. No. 13/769,356, dated May 30, 2017, 2 pages.
"Advisory Action", U.S. Appl. No. 13/769,356, dated Dec. 16, 2016, 3 pages.
"Advisory Action", U.S. Appl. No. 14/729,793, dated Feb. 13, 2018, 2 pages.
"Final Office Action", U.S. Appl. No. 13/769,356, dated Mar. 23, 2016, 15 pages.
"Final Office Action", U.S. Appl. No. 13/769,356, dated Sep. 30, 2016, 15 pages.
"Final Office Action", U.S. Appl. No. 14/729,793, dated Dec. 1, 2017, 17 pages.
"Foreign Office Action", CN Application No. 201480009165.3, dated Apr. 12, 2017, 16 pages.
"International Preliminary Report on Patentability", Application No. PCT/US2016/031699, dated Feb. 22, 2017, 6 pages.
"International Search Report and Written Opinion", Application No. PCT/US2016/031699, dated Nov. 11, 2016, 23 pages.
"Non-Final Office Action", U.S. Appl. No. 13/769,356, dated Jun. 30, 2016, 16 pages.
"Non-Final Office Action", U.S. Appl. No. 14/033,508, dated Dec. 3, 2015, 14 pages.
"Non-Final Office Action", U.S. Appl. No. 14/729,793, dated Mar. 31, 2017, 14 pages.
"Non-Final Office Action", U.S. Appl. No. 15/283,913, dated Feb. 10, 2017, 20 pages.
"Notice of Allowance", U.S. Appl. No. 14/033,508, dated May 6, 2016, 9 pages.
"Notice of Allowance", U.S. Appl. No. 15/269,594, dated Jan. 31, 2018, 8 pages.
"Notice of Allowance", U.S. Appl. No. 15/283,913, dated Mar. 19, 2018, 10 pages.
"Notice of Allowance", U.S. Appl. No. 15/283,913, dated Sep. 6, 2017, 9 pages.
"Second Written Opinion", Application No. PCT/US2014/016151, dated Jan. 29, 2015, 6 pages.

* cited by examiner

HAPTIC FEEDBACK FOR A TOUCH INPUT DEVICE

BACKGROUND

Modern computing devices utilize a variety of different types of feedback to indicate to users that certain functionalities are available and that certain actions are occurring or about to occur. For instance, when a user hovers a cursor over a hyperlink, visual feedback can be presented that indicates that the hyperlink is selectable to navigate to a particular network location. In another example, audio feedback can be presented to indicate an incoming communication, such as a new instant message.

One particularly useful type of feedback is haptic feedback, which provides tactilely-perceptible feedback via various mechanisms. For instance, a touchscreen may employ a tactile device (e.g., a piezo-electric device) to provide a localized vibration when a user presses a virtual button displayed on the touchscreen. Such haptic feedback represents a tactile reinforcement that the user has successfully selected the virtual button, and may be combined with other types of feedback (e.g., visual and audio feedback) to increase the perceptibility of certain actions and functionalities. While haptic feedback can be leveraged in a variety of scenarios, it can be difficult to comprehensively incorporate across different applications and services that may not have the ability to invoke haptic mechanisms.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for haptic feedback for a touch input device are described. Generally, haptic feedback is provided for different user interactions with a touch input device, such as interactions with applications, services, and so forth. According to various embodiments, how haptic feedback is initiated depends on whether different functionalities directly support haptic feedback. For instance, techniques described herein enable haptic feedback to be provided whether or not a particular functionality directly supports haptic feedback.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
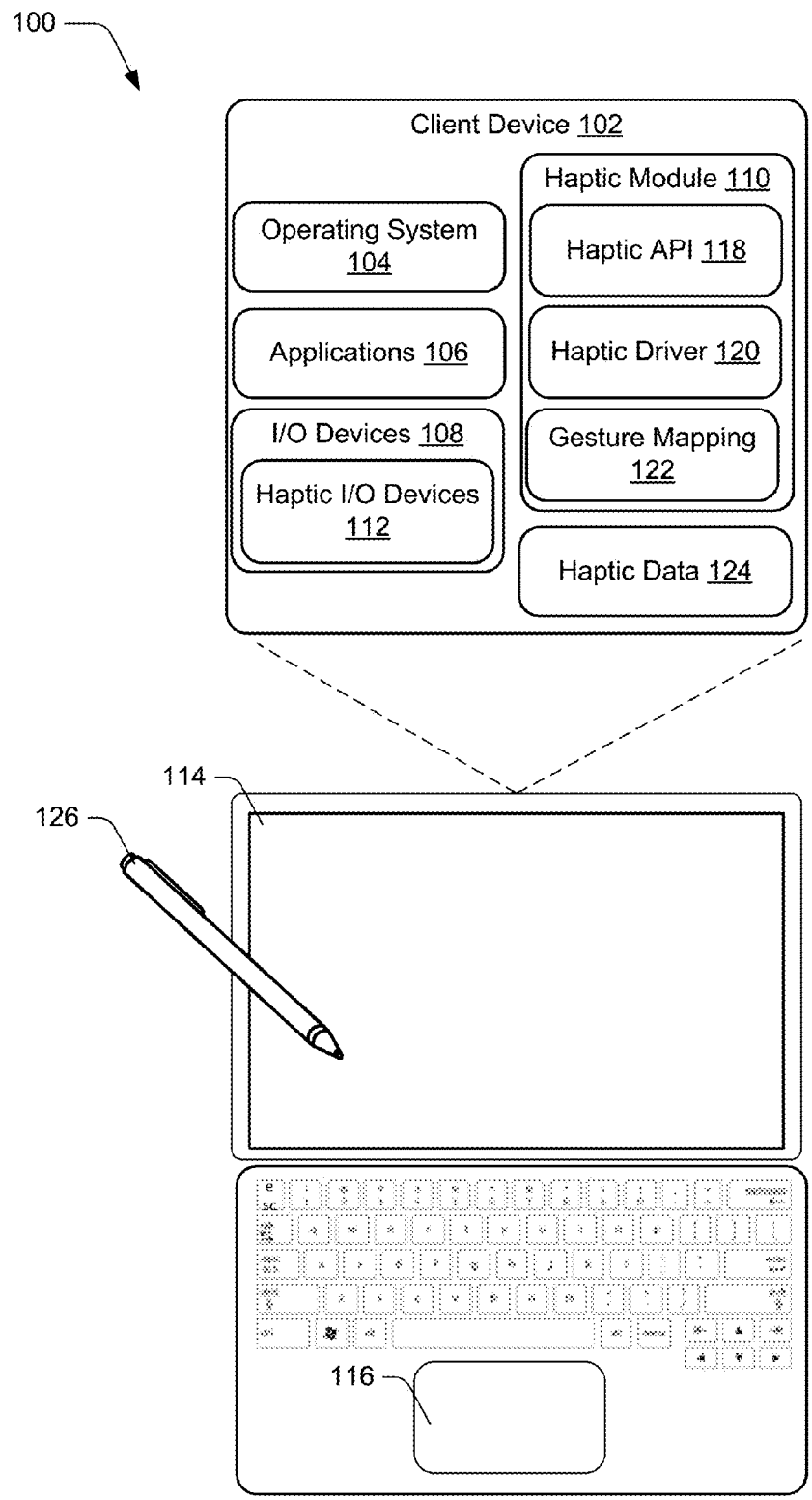
FIG. 1 is an illustration of an environment in an example implementation that is operable to employ techniques discussed herein.

Techniques for haptic feedback for a touch input device are described. Generally, haptic feedback is provided for different user interactions with a touch input device, such as interactions with applications, services, and so forth. According to various implementations, how haptic feedback is initiated depends on whether different functionalities directly support haptic feedback.

For instance, consider a first scenario where a user is providing a touch gesture to a haptic-enabled touch input device to provide input to a graphical user interface (GUI) of an application. Further, consider that the application directly supports haptic feedback. An application that directly supports haptic feedback, for instance, represents an application that includes logic to recognize different types of user input and to initiate specific haptic feedback based on the user input and application context. Generally, application context refers to various application-specific scenarios, such as GUI context, application state, and so forth. Accordingly, in this particular scenario the application directly supports haptic feedback, and thus recognizes the user input to the GUI and causes the touch input device to generate haptic feedback based on attributes of the user input.

Consider now a second scenario where a user is providing a touch gesture to the haptic-enabled touch input device to provide input to a GUI of a different application. Further, consider that the different application does not directly support haptic feedback. An application that does not directly support haptic feedback, for instance, represents an application that does not include direct logic to initiate specific haptic feedback based on user input and/or application context. Accordingly, techniques discussed herein enable haptic feedback to be provided on the touch input device even though the different application does not directly support haptic feedback. For example, haptic functionality of the touch input device (e.g., firmware, a device driver, and so forth) recognizes attributes of the touch gesture and generates predefined haptic feedback based on the attributes. Thus, haptic feedback can be provided even though a particular functionality does not directly support haptic feedback, such as a particular application, a particular operating system, and so forth.

Accordingly, techniques described herein enable haptic feedback to be provided across a variety of different systems and functionalities, and in scenarios where particular systems and/or functionalities do not directly support haptic feedback.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for haptic feedback for a touch input device described herein. The environment 100 includes a client device 102, which may be configured in a variety of ways, such as a traditional computer (e.g., a desktop personal computer, laptop computer, and so on), a mobile device, an entertainment appliance, a smartphone, a wearable device, a netbook, a game console, a handheld device (e.g., a tablet), and so forth.

The client device 102 includes a variety of different functionalities that enable various activities and tasks to be performed. For instance, the client device 102 includes an operating system 104, applications 106, input/output ("I/O") devices 108, and a haptic module 110. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represent functionalities for performing different tasks via the client device 102. Examples of the applications 106 include a word processing application, a spreadsheet application, a web browser, a gaming application, a communication application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The I/O devices 108 are representative of different functionalities for receiving input to the client device 102 and/or for providing output from the client device 102. Particular instances of the I/O devices 108, for example, represent a dedicated input device, a dedicated output device, or a device that both receives input and provides output. The I/O devices 108 include haptic input/output ("I/O") devices 112, which are representative of devices that are configured to provide haptic output. For instance, the haptic I/O devices 112 include a touchscreen 114 and a trackpad 116, which are configured to provide haptic feedback which is tactilely-perceptible. The touchscreen 114, for example, is not only configured to provide visual output, but can also receive touch input and provide haptic output. Further, the trackpad 116 can not only receive touch input for the client device 102, but can provide various types of haptic output. Generally, the haptic I/O devices 112 may utilize a variety of different haptic-generating mechanisms to generate haptic feedback, such as motors, magnets, linear resonant actuators (LRAs) (magnetic and piezo based), piezo-electric bars, and so forth.

The haptic module 110 is representative of functionality for enabling the client device 102 to provide various types of haptic output. For instance, the haptic module 110 represents hardware and logic for enabling the haptic I/O devices to output various types of haptic feedback. The haptic module 110, for example, includes a haptic application programming interface (API) 118, a haptic driver 120, and gesture mapping 122. Generally, the haptic API 118 and the haptic driver 120 are representative of functionalities to enable various other functionalities to invoke the haptic I/O devices. For instance, the operating system 104 and the applications 106 may call the haptic API 118 to request that a particular haptic I/O device 112 generate haptic feedback. The haptic API 118 then interfaces with the haptic driver 120, which in turn interfaces with the haptic I/O devices 112 to cause the haptic I/O devices 112 to generate haptic feedback. Example interactions between the various entities included in the environment 100 are described below.

The gesture mapping 122 represents mappings of different gestures to different respective types of haptic feedback. For instance, different gesture attributes can cause different respective types of haptic feedback to be generated. As further detailed below, in an event that a functionality external to the haptic I/O devices 112 (e.g., an application 106, the operating system 104, and so forth) does not directly support haptic feedback, the haptic module 110 can detect attributes of a gesture applied to a haptic I/O device 112 and cause a particular type of haptic feedback to be output by the haptic I/O device 112 based on the attributes.

In at least some implementations, the haptic module 110 can be implemented as part of the haptic I/O devices 112, such as in firmware of the haptic I/O devices 112. Alternatively or additionally, the haptic module 110 may be implemented as part of system resources of the client device 102, such as part of the operating system 104.

The client device 102 further includes haptic data 124, which represents information about whether different functionalities directly support haptic feedback. For instance, the haptic data 124 includes identifiers for individual applications of the applications 106, and indicates whether each of the individual applications support haptic feedback. The haptic data 124 may also indicate whether other functionalities directly support haptic feedback, such as the operating system 104, other services that reside on the client device 102, and so forth. Generally, the haptic data 124 may be implemented as part of the haptic module 110, as part of the operating system 104, and/or as a standalone set of haptic data that is accessible by different functionalities of the client device 102.

Further illustrated as part of the environment 100 is a haptic-enabled pen 126, which is representative of an instance of the haptic I/O devices 112. Generally, the haptic-enabled pen 126 represents a handheld input apparatus that includes various internal components that can generate haptic feedback in various scenarios. For instance, the haptic-enabled pen 126 can provide input to the touchscreen 114, and based on various events can generate haptic feedback. The various implementations and scenarios discussed below, for example, may apply to haptic feedback generated by various haptic-enabled devices, such as the trackpad 116, the touchscreen 114, and the haptic-enabled pen 126.

Having described an example environment in which the techniques described herein may operate, consider now a discussion of an example implementation scenario for haptic feedback for a touch input device in accordance with one or more embodiments.

Example Implementation Scenarios

The following section describes some example implementation scenarios for haptic feedback for a touch input device in accordance with one or more implementations. The implementation scenarios may be implemented in the environment 100 discussed above, and/or any other suitable environment.

Figure 2:
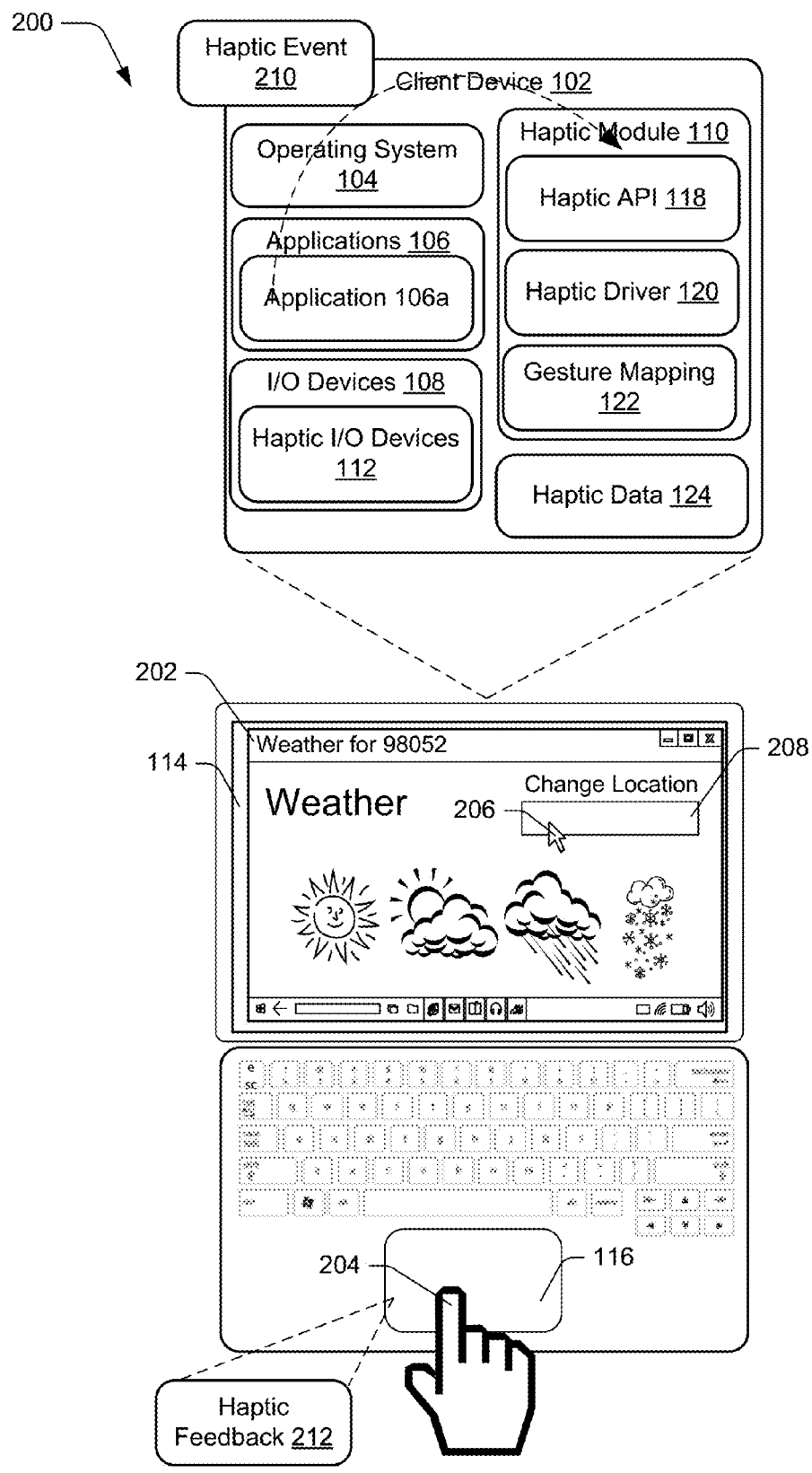
FIG. 2 illustrates an example implementation scenario for an application that supports haptic feedback in accordance with one or more embodiments.

FIG. 2 depicts an example implementation scenario 200 for an application that directly supports haptic feedback in accordance with one or more implementations. The scenario 200 includes various entities and components introduced above with reference to the environment 100.

In the scenario 200, an application 106a is active and a graphical user interface (GUI) 202 for the application 106a is displayed on the touchscreen 114 of the client device 102. Further, the application 106a is configured to initiate haptic feedback based on various application-related events. For instance, the application 106a includes logic for interacting with the haptic module 110, such as via the haptic API 118. Alternatively or additionally, the application 106a is configured to initiate haptic feedback via interaction with the operating system 104. For instance, the operating system 104 may serve as an intermediary between the application 106a and the haptic module 110.

Continuing with the scenario 200, a user provides input to the trackpad 116 to interact with the GUI 202. For instance, the user's finger 204 moves across the surface of the trackpad 116 to move a cursor 206 within the GUI 202. In this particular example, the user moves the cursor 206 within proximity to an action region 208. Generally, an action region refers to a region of the GUI 202 associated with a particular available action. For instance, the action region 208 is configured to receive user input specifying a particular location for retrieving and displaying weather-related information.

In response to detecting the cursor 206 in proximity to (e.g., touching and/or overlapping) the action region 208, the application 106a fires a haptic event 210 to the haptic module 110. For instance, the haptic event 210 is communicated directly from the application 106a to the haptic module 110 via the haptic API 118. Alternatively, the application 106a communicates the haptic event 210 to the operating system 104, and the operating system 104 forwards the haptic event 210 to the haptic module 110. Generally, the haptic event 210 represents an "external" haptic event since the haptic event 210 is generated by an external functionality that is external to the haptic module 110 and the haptic I/O devices 112.

According to various implementations, the haptic event 210 specifies a particular type of haptic feedback to be generated by the trackpad 116. For instance, different action regions of the GUI 202 can be linked to different types of haptic feedback. Accordingly, in response to receiving the haptic event 210, the haptic module 110 causes the trackpad 116 to generate haptic feedback 212. For instance, the haptic module 110 instructs the haptic driver 120 to cause the trackpad 116 to generate the haptic feedback 212. The haptic feedback 212, for example, is produced by a haptic mechanism of the trackpad 116, and is tactilely perceptible on the surface of the trackpad 116, such as by the user's finger 204.

In at least some implementations, the haptic module 110 is configured to track which applications 106 directly support haptic feedback, and which applications 106 do not. For instance, a particular application 106 that directly supports haptic feedback represents an application 106 that is configured to generate haptic events to notify the haptic module 110 to generate haptic feedback. However, a different application 106 that does not directly support haptic feedback represents an application 106 that is not configured to generate haptic events. Thus, the scenario 200 represents an implementation where the application 106a directly supports haptic feedback and is thus configured to generate the haptic event 210 to cause the haptic feedback 212 to be generated.

Figure 3:
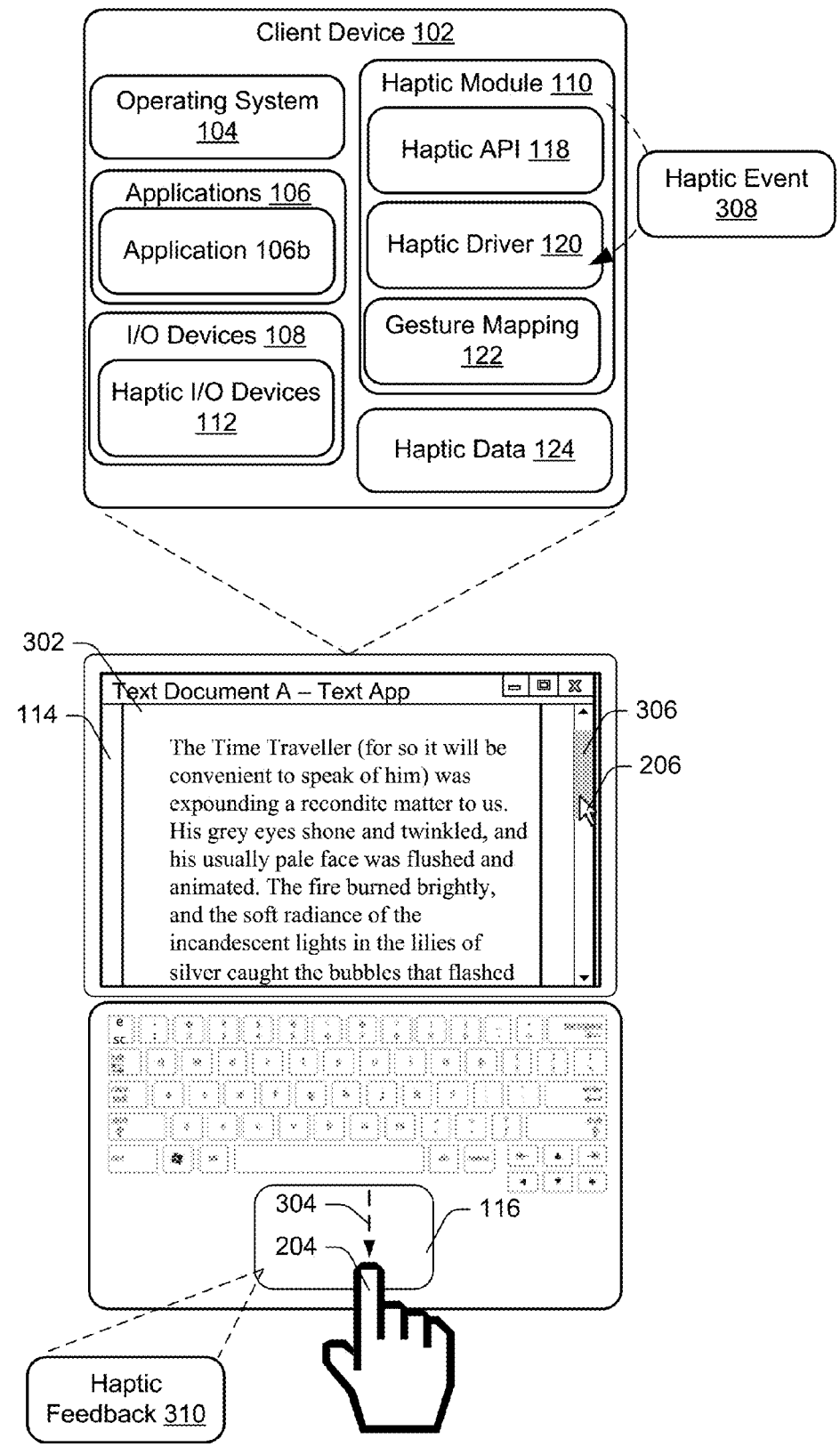
FIG. 3 depicts an example implementation scenario for an application that does not directly support haptic feedback in accordance with one or more embodiments.

FIG. 3 depicts an example implementation scenario 300 for an application that does not directly support haptic feedback in accordance with one or more implementations. The scenario 300 includes various entities and components introduced above with reference to the environment 100. In at least some implementations, the scenario 300 represents an extension and/or variation on the scenario 200, described above.

In the scenario 300, an application 106b is active and a graphical user interface (GUI) 302 for the application 106b is displayed on the touchscreen 114 of the client device 102. Further, the application 106b is not configured to initiate haptic feedback based on various application-related events. For instance, the application 106b does not include logic for interacting with the haptic module 110. The application 106b, for example, does not directly support generating haptic events.

Continuing with the scenario 300, a user provides input to the trackpad 116 to interact with the GUI 202b. For instance, the user's finger 204 moves across the surface of the trackpad 116 to move the cursor 206 within the GUI 302. In this particular example, the user provides a gesture 304 to the trackpad 116 to move the cursor 206 and drag a scroll bar 306 downward. Since the application 106b does not directly support haptic feedback, the haptic module 110 detects the gesture 304 and fires a haptic event 308 to the haptic driver 120. The haptic module 110, for instance, fires the haptic event 308 without direct interaction with the application 106b. Alternatively or additionally, the haptic module 110 queries the operating system 104 for permission to generate haptic feedback (e.g., fire the haptic event 308) while the application 106b is active, e.g., has focus on the touchscreen 114.

Responsive to receiving the haptic event 308, the haptic driver 120 causes the trackpad 116 to generate haptic feedback 310. For instance, the operating system 104 detects that the application 106b has focus and that the application 106b does not directly support haptic feedback, such as based on an entry in the haptic data 124 that indicates that the application 106b does not directly support haptic feedback. Accordingly, the operating system 104 notifies the haptic module 110 (e.g., via the haptic API 118) that an application currently in focus does not directly support haptic feedback. Alternatively or additionally, the operating system 104 notifies the haptic module 110 that the application 106b has focus, and the haptic module 110 looks up the application 106b in the haptic data 124 to determine that the application 106b does not directly support haptic feedback.

Responsive to detecting the gesture 304 and ascertaining that the application 106b does not directly support haptic feedback, the haptic module 110 determines that the haptic feedback 310 is to be generated by the trackpad 116. In an example implementation, the haptic module 110 determines a gesture type for the gesture 304, and determines the haptic feedback 310 based on the gesture type. The haptic module 110, for instance, determines the gesture type based on attributes of the gesture 304. Examples of such gesture attributes include direction of movement of the gesture relative to the trackpad 116 (e.g., up, down, left, right, and so forth), distance of movement, velocity of movement, acceleration and/or deceleration, an amount of pressure applied while generating the gesture 304, and so forth. One of more of such gesture attributes can be considered in characterizing a gesture type for the gesture 304.

For example, different sets of gesture attributes can correspond to different respective gesture types. Further, different gesture types can be mapped to different respective types of haptic feedback, such as in the gesture mapping 122. For instance, a tap gesture can be mapped to one type of haptic feedback, a swipe gesture to another type of haptic feedback, a drag gesture to still another type of haptic feedback, and so on. In the particular example presented in scenario 300, the haptic module 110 ascertains that the gesture 304 is a downward dragging gesture on the trackpad 116, maps the gesture 304 to haptic feedback identified for the gesture 304 in the gesture mapping 122, and generates the haptic event 308 to identify the haptic feedback 310. Based on information included in the haptic event 308, the haptic driver 120 initiates the haptic feedback 310 on the trackpad 116.

According to various implementations, the haptic module 110 causes the haptic feedback 310 to be generated by the trackpad 116 independent of a notification from the application 106*b* to generate haptic feedback, and independent of any information concerning an input context of the application 106*b*. For instance, the haptic module 110 causes the haptic feedback 310 to be generated based on attributes of the gesture 304 itself and without any input (e.g., context and/or instructions) from the application 106*b*. Thus, the haptic event 308 represents an "internal" haptic event since the haptic event 308 is generated internally to the haptic module 110 and/or the trackpad 116 and independent of direct interaction with the application 106*b*.

Accordingly, the scenarios described above illustrate that implementations for haptic feedback for a touch input device described herein can differentiate between functionalities that directly support haptic feedback and functionalities that do not directly support haptic feedback, and can enable haptic feedback to be generated in both cases. While these scenarios are discussed with reference to different applications, it is to be appreciated that implementations discussed herein can be employed with a wide variety of different functionalities, such as different applications, services, operating systems, and so forth. For instance, techniques described herein can be employed to generate haptic feedback on a device with an operating system that does not directly support haptic feedback.

Further, while the scenarios described above are discussed with reference to the trackpad 116, it is to be appreciated that the scenarios may be implemented with any haptic-enabled device, such as the touchscreen 114, the haptic-enabled pen 126, and so forth.

Having discussed some example implementation scenarios, consider now a discussion of some example procedures in accordance with one or more embodiments.

Example Procedures

The following discussion describes some example procedures for haptic feedback for a touch input device in accordance with one or more embodiments. The example procedures may be employed in the environment 100 of FIG. 1, the system 700 of FIG. 7, and/or any other suitable environment. The procedures, for instance, represent example procedures for implementing the implementation scenarios described above. In at least some implementations, the steps described for the various procedures are implemented automatically and independent of user interaction.

Figure 4:
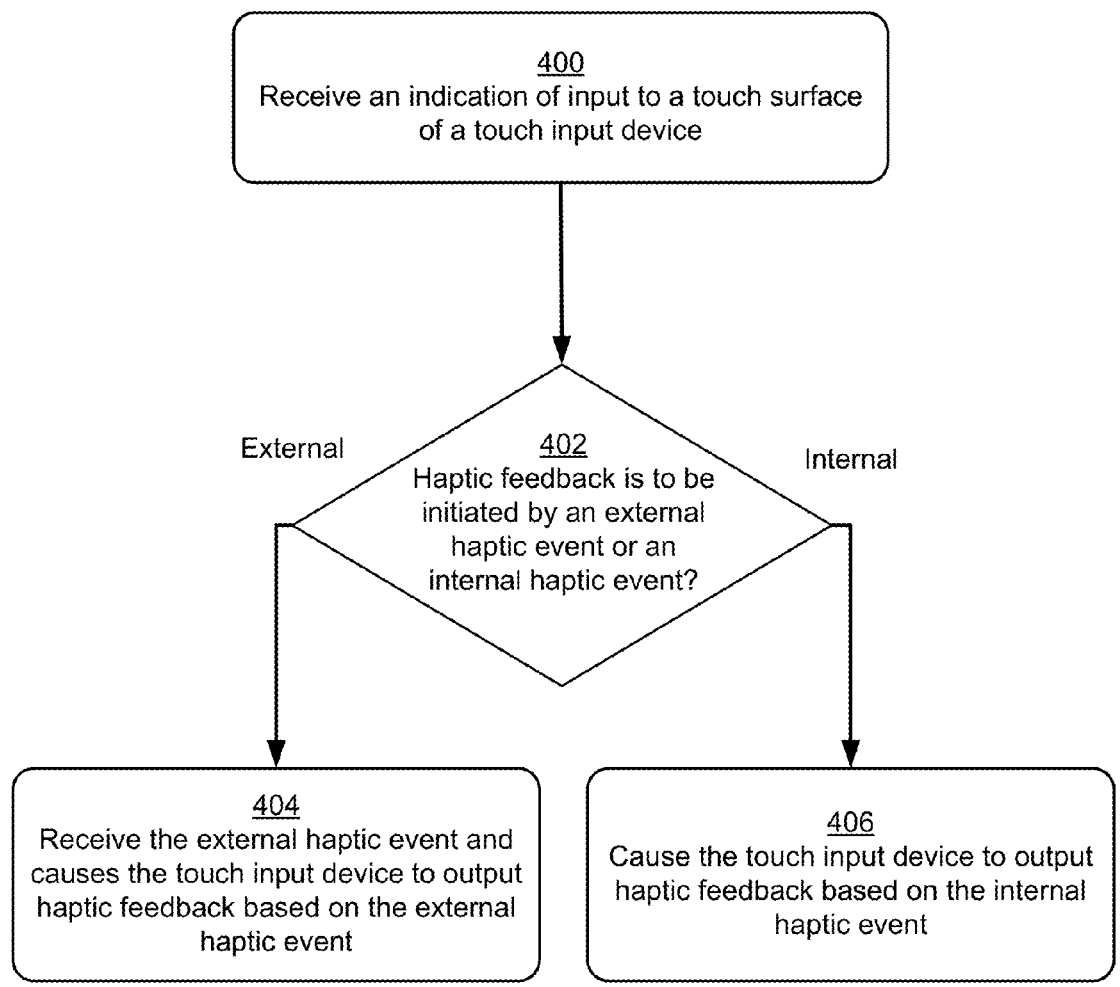
FIG. 4 is a flow diagram that describes steps in a method for causing output of haptic feedback in accordance with one or more embodiments.

FIG. 4 is a flow diagram that describes steps in a method in accordance with one or more implementations. The method describes an example procedure for causing output of haptic feedback in accordance with one or more implementations. In at least some implementations, the method may be performed at least in part by the haptic module 110 and/or by the operating system 104.

Step 400 receives an indication of input to a touch surface of a touch input device. The haptic module 110, for instance, detects that user input is provided to a touch surface of a haptic I/O device 112, such as one of the trackpad 116 or the touchscreen 114.

Step 402 ascertains whether haptic feedback for the input is to be initiated by an external haptic event or an internal haptic event. Generally, an external haptic event represents a haptic event received by the haptic module 110 from an external functionality that is external to the touch input device, such as an application 106 that directly supports haptic feedback, the operating system 104, and so forth. One example implementation of an external haptic event is the haptic event 210 discussed above. An internal haptic event represents a haptic event generated by the touch input device in response to the input. One example implementation of an internal haptic event is the haptic event 308 discussed above. An example way of determining whether a haptic feedback is to be generated based on an external haptic event or an internal haptic event is discussed below.

In an event that the haptic feedback for the input is to be initiated by an external haptic event ("External"), step 404 receives the external haptic event and causes the touch input device to output haptic feedback based on the external haptic event. For example, the haptic module 110 receives a haptic event from an application 106 and/or the operating system 104. Generally, the haptic event includes information describing attributes of the haptic feedback to be output by the touch input device. Examples of attributes of haptic feedback include vibration frequency, vibration amplitude, feedback duration, haptic pulse information, variations in frequency and/or amplitude, and so forth.

In an event that the haptic feedback for the input is to be initiated by an internal haptic event ("Internal"), step 406 causes the touch input device to output haptic feedback based on the internal haptic event. For example, the haptic module 110 communicates the internal haptic event to the haptic driver 120 to cause the touch input device (e.g., one of the haptic I/O devices 112) to output haptic feedback. The internal haptic event, for instance, includes information describing attributes of the haptic feedback to be output by the touch input device, examples of which are described above. In at least some implementations, attributes of haptic feedback are determined based on attributes of a gesture applied to the touch input device to generate the input to the touch surface. An example way of determining attributes of haptic feedback is discussed below.

Figure 5:
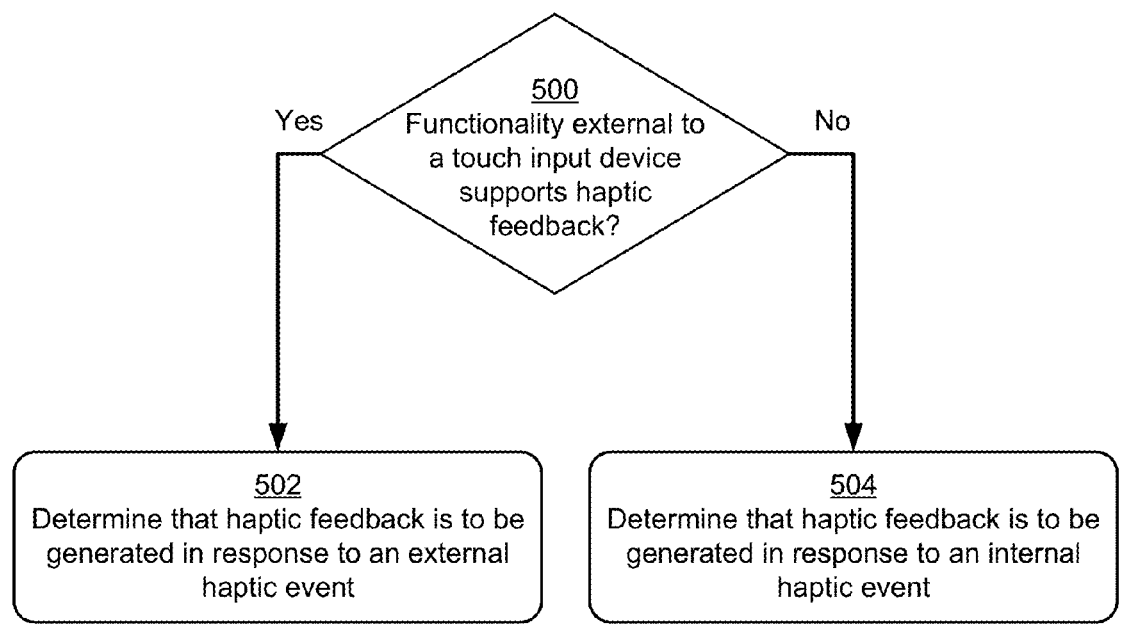
FIG. 5 is a flow diagram that describes steps in a method for determining whether a haptic feedback is to be generated based on an external haptic event or an internal haptic event in accordance with one or more embodiments.

FIG. 5 is a flow diagram that describes steps in a method in accordance with one or more implementations. The method describes an example procedure for determining whether a haptic feedback is to be generated based on an external haptic event or an internal haptic event in accordance with one or more implementations. In at least some implementations, the method may be performed at least in part by the haptic module 110 and/or by the operating system 104.

Step 500 determines whether a functionality external to a touch input device directly supports haptic feedback. The haptic module 110, for instance, determines whether an application 106 that currently has focus on the client device 102 directly supports haptic feedback, and/or whether the operating system 104 directly supports haptic feedback. The applications 106 and the operating system 104, for example, represent functionalities that are external to the touch input device, i.e., external to the haptic I/O devices 112.

If the functionality external to the touch input device directly supports haptic feedback ("Yes"), step 502 determines that haptic feedback is to be generated in response to an external haptic event. An application 106 that currently has focus, for instance, notifies the haptic module 110 that the application directly supports haptic feedback. Alternatively or additionally, the operating system 104 notifies the haptic module 110 that an application 106 that currently has focus directly supports haptic feedback, and/or that the operating system 104 itself directly supports haptic feedback. In at least some implementations, an external functionality interacts with the haptic module 110 via calls to the haptic API 118.

In yet another implementation, the haptic module 110 determines from the haptic data 124 whether a particular application 106 and/or the operating system 104 directly support haptic feedback. For instance, the haptic module 110 can determine whether an external functionality directly supports haptic feedback by ascertaining whether the haptic data 124 indicates that the external functionality directly supports/doesn't directly support haptic feedback.

If the functionality external to the touch input device does not directly support haptic feedback ("No"), step 504 determines that haptic feedback is to be generated in response to an internal haptic event. For instance, the operating system 104 notifies the haptic module 110 that an application 106 that currently has focus does not directly support haptic feedback. Alternatively or additionally, and as discussed above, the haptic module 110 can determine whether an external functionality directly supports haptic feedback by ascertaining whether the haptic data 124 indicates that the external functionality directly supports/doesn't directly support haptic feedback.

Figure 6:
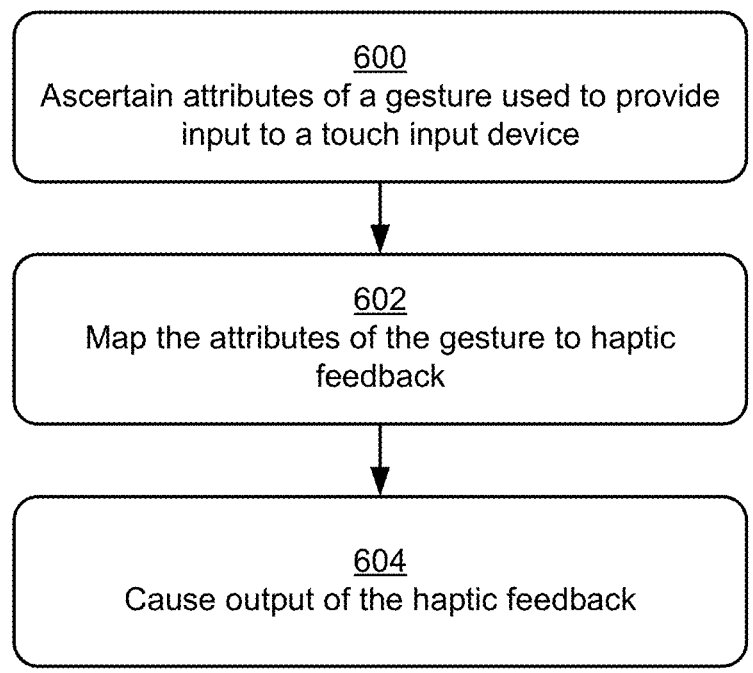
FIG. 6 is a flow diagram that describes steps in a method for determining attributes of haptic feedback in accordance with one or more embodiments.

FIG. 6 is a flow diagram that describes steps in a method in accordance with one or more implementations. The method describes an example procedure for determining attributes of haptic feedback in accordance with one or more implementations. In at least some implementations, the method may be performed at least in part by the haptic module 110 and/or by the operating system 104. The method, for instance, represents an implementation of step 406 discussed above with reference to FIG. 4.

Step 600 ascertains attributes of a gesture used to provide input to a touch input device. Examples of gesture attributes include direction relative to a surface to which the gesture is applied (e.g., up, down, left, right, and so forth), distance of movement, velocity of movement, acceleration and/or deceleration, an amount of pressure applied while generating the gesture, and so forth.

Step 602 maps the attributes of the gesture to haptic feedback. For instance, different gesture attributes can be mapped to different types of haptic feedback. In at least some implementations, the haptic module 110 maps the attributes of the gesture to a particular type of haptic feedback specified for the attributes in the gesture mapping 122.

Step 604 causes output of the haptic feedback. The haptic module 110, for instance, instructs the haptic driver 120 to output the haptic feedback.

Accordingly, techniques discussed herein enable haptic feedback to be provided in a wide variety of scenarios and across a wide variety of different device configurations.

Having discussed some example procedures, consider now a discussion of an example system and device in accordance with one or more embodiments.

Example System and Device

Figure 7:
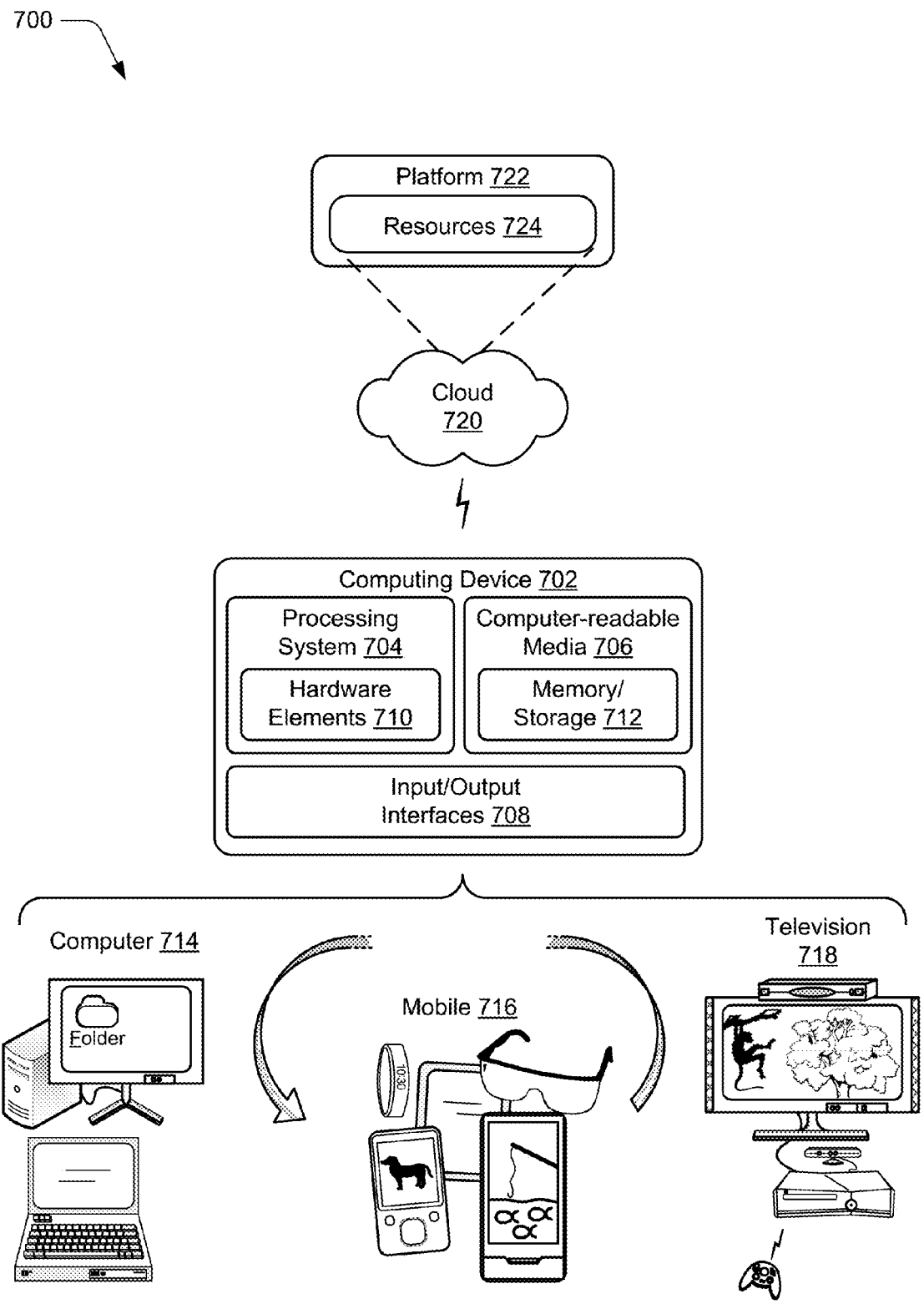
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement various techniques described herein. For example, the client device 102 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more Input/Output (I/O) Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules that are executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a wearable device, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to the haptic module 110 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 70.

Implementations discussed herein include:

Example 1

A system for causing haptic feedback, the system including: a haptic-enabled touch input device; at least one processor; and one or more computer-readable storage media including instructions stored thereon that, responsive to execution by the at least one processor, cause the system perform operations including: receiving an indication of input via the touch input device; ascertaining whether haptic feedback for the input is to be initiated by an external haptic event received from an external functionality that is external to the touch input device, or whether haptic feedback is to be initiated by an internal haptic event generated by the touch input device in response to the input; and causing the touch input device to output haptic feedback based on one of the external haptic event or the internal haptic event.

Example 2

A system as described in example 1, wherein the touch input device includes one or more of a haptic-enabled trackpad, a haptic-enabled touchscreen, or a haptic-enabled pen.

Example 3

A system as described in one or more of examples 1 or 2, wherein the one or more computer-readable storage media includes firmware of the touch input device.

Example 4

A system as described in one or more of examples 1-3, wherein the operations further include determining that the external functionality directly supports haptic feedback, wherein said ascertaining includes ascertaining that the haptic feedback for the input is to be initiated by an external haptic event, and said causing includes causing the touch input device to output haptic feedback based on the external haptic event.

Example 5

A system as described in one or more of examples 1-4, wherein the external functionality includes an application that currently has focus, the operations further include determining that the application directly supports haptic feedback, and wherein said ascertaining includes ascertaining that the haptic feedback for the input is to be initiated by an external haptic event received from the application, and said causing includes causing the touch input device to output haptic feedback based on the external haptic event.

Example 6

A system as described in one or more of examples 1-5, wherein the external functionality includes an operating system, the operations further include determining that the operating system directly supports haptic feedback, and wherein said ascertaining includes ascertaining that the haptic feedback for the input is to be initiated by an external haptic event received from the operating system, and said causing includes causing the touch input device to output haptic feedback based on the external haptic event.

Example 7

A system as described in one or more of examples 1-6, wherein the operations further include determining that the external functionality does not directly support haptic feedback, wherein said ascertaining includes ascertaining that the haptic feedback for the input is to be initiated by an internal haptic event, and said causing includes causing the touch input device to output haptic feedback based on the internal haptic event.

Example 8

A system as described in one or more of examples 1-7, wherein the external functionality includes an application that currently has focus, the operations further include determining that the application does not directly support haptic feedback, and wherein said ascertaining includes ascertaining that the haptic feedback for the input is to be initiated by an internal haptic event, and said causing includes causing the touch input device to output haptic feedback based on the internal haptic event.

Example 9

A system as described in one or more of examples 1-8, wherein the external functionality includes an operating system, the operations further include determining that the operating system does not directly support haptic feedback, and wherein said ascertaining includes ascertaining that the haptic feedback for the input is to be initiated by an internal haptic event, and said causing includes causing the touch input device to output haptic feedback based on the internal haptic event.

Example 10

A system as described in one or more of examples 1-9, wherein said ascertaining includes ascertaining that the haptic feedback for the input is to be initiated by an internal haptic event, and said causing includes: ascertaining one or more attributes of a gesture used to provide the input to the touch input device; and causing output of the haptic feedback based on the one or more attributes.

Example 11

A computer-implemented method for causing output of haptic feedback, the method including: receiving an indication of input to a touch surface of a touch input device; ascertaining whether haptic feedback for the input is to be initiated by an external haptic event received from an external functionality that is external to the touch input device, or whether haptic feedback is to be initiated by an internal haptic event generated by the touch input device in response to the input; and causing the touch input device to output haptic feedback based on one of the external haptic event or the internal haptic event.

Example 12

A method as described in example 11, further including determining based on haptic data whether the external functionality directly supports haptic feedback, and wherein said ascertaining includes one of: in an event that the haptic data indicates that the external functionality directly supports haptic feedback, ascertaining that the haptic feedback for the input is to be initiated by the external haptic event received from an external functionality; or in an event that the haptic data indicates that the external functionality does not directly support haptic feedback, ascertaining that the haptic feedback is to be initiated by the internal haptic event generated by the touch input device in response to the input.

Example 13

A method as described in one or more of examples 11 or 12, further including receiving a notification that the external functionality directly supports haptic feedback, wherein said ascertaining includes ascertaining that the haptic feedback for the input is to be initiated by an external haptic event, and said causing includes causing the touch input device to output haptic feedback based on the external haptic event.

Example 14

A method as described in one or more of examples 11-13, wherein said ascertaining includes ascertaining that the haptic feedback for the input is to be initiated by an internal haptic event, and said causing includes: ascertaining one or more attributes of a gesture used to provide the input to the touch input device; mapping the attributes of the gesture to haptic feedback; and causing output of the haptic feedback.

Example 15

A computer-implemented method for causing output of haptic feedback, the method including: receiving an indication of input to a touch input device; determining that an external functionality external to the touch input device does not directly support haptic feedback; ascertaining, responsive to said determining, that haptic feedback for the input is to be initiated by an internal haptic event generated by the touch input device in response to the input; ascertaining one or more attributes of a gesture that caused the input; and causing the touch input device to output haptic feedback in response to the internal haptic event and based on the one or more attributes of the gesture.

Example 16

A method as described in example 15, wherein said determining includes receiving a notification that the external functionality does not directly support haptic feedback.

Example 17

A method as described in one or more of examples 15 or 16, wherein the external functionality includes an application that does not directly support haptic feedback, and wherein the input includes input to a graphical user interface of the application.

Example 18

A method as described in one or more of examples 15-17, wherein the external functionality includes an operating system that does not directly support haptic feedback.

Example 19

A method as described in one or more of examples 15-18, wherein said ascertaining one or more attributes of the gesture includes ascertaining one or more of a direction of movement of the gesture relative to the touch input device, distance of movement of the gesture, velocity of movement of the gesture, acceleration of the gesture, deceleration of the gesture, or an amount of pressure applied to the touch input device while generating the gesture.

Example 20

A method as described in one or more of examples 15-19, wherein the external functionality includes an application, and wherein said causing is performed independent of information concerning an input context of the application.

CONCLUSION

Techniques for haptic feedback for a touch input device are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
a haptic-enabled touch input device;
at least one processor; and
one or more computer-readable storage media including instructions stored thereon that, responsive to execution by the at least one processor, cause the system perform operations including:
receiving an indication of input via the touch input device indicating a user interaction with a functionality, the functionality representing one of an application or an operating system;
ascertaining whether haptic feedback for the input is to be initiated by an external haptic event received from the functionality, or whether haptic feedback is to be initiated by an internal haptic event generated by the touch input device in response to the input, said ascertaining based on at least in part on a determination of whether the functionality supports haptic feedback; and
causing the touch input device to output haptic feedback based on one of the external haptic event or the internal haptic event, including at least one of:
in an event that a determination is made that the functionality directly supports haptic feedback, ascertaining that the haptic feedback for the input is to be initiated by the external haptic event, and causing the touch input device to output haptic feedback based on the external haptic event; or
in an event that a determination is made that the functionality does not directly support haptic feedback, ascertaining that the haptic feedback for the input is to be initiated by the internal haptic event, and causing the touch input device to output haptic feedback based on the internal haptic event.

2. A system as recited in claim 1, wherein the touch input device comprises one or more of a haptic-enabled trackpad, a haptic-enabled touchscreen, or a haptic-enabled pen.

3. A system as recited in claim 1, wherein the one or more computer-readable storage media comprises firmware of the touch input device.

4. A system as recited in claim 1, wherein the operations further include determining that the functionality directly supports haptic feedback, wherein said ascertaining comprises ascertaining that the haptic feedback for the input is to be initiated by the external haptic event, and said causing comprises causing the touch input device to output haptic feedback based on the external haptic event.

5. A system as recited in claim 1, wherein the functionality comprises the application, the application currently has focus, the operations further include determining that the application directly supports haptic feedback, and wherein said ascertaining comprises ascertaining that the haptic feedback for the input is to be initiated by an external haptic event received from the application, and said causing comprises causing the touch input device to output haptic feedback based on the external haptic event received from the application.

6. A system as recited in claim 1, wherein the functionality comprises the operating system, the operations further include determining that the operating system directly supports haptic feedback, and wherein said ascertaining comprises ascertaining that the haptic feedback for the input is to be initiated by an external haptic event received from the operating system, and said causing comprises causing the touch input device to output haptic feedback based on the external haptic event received from the operating system.

7. A system as recited in claim 1, wherein the operations further include determining that the functionality does not directly support haptic feedback, wherein said ascertaining comprises ascertaining that the haptic feedback for the input is to be initiated by the internal haptic event, and said causing comprises causing the touch input device to output haptic feedback based on the internal haptic event.

8. A system as recited in claim 1, wherein the functionality comprises the application, the application currently has focus, the operations further include determining that the application does not directly support haptic feedback, and wherein said ascertaining comprises ascertaining that the haptic feedback for the input is to be initiated by the internal haptic event, and said causing comprises causing the touch input device to output haptic feedback based on the internal haptic event.

9. A system as recited in claim 1, wherein the functionality comprises the operating system, the operations further include determining that the operating system does not directly support haptic feedback, and wherein said ascertaining comprises ascertaining that the haptic feedback for the input is to be initiated by the internal haptic event, and said causing comprises causing the touch input device to output haptic feedback based on the internal haptic event.

10. A system as recited in claim 1, wherein said ascertaining comprises ascertaining that the haptic feedback for the input is to be initiated by the internal haptic event, and said causing comprises:
ascertaining one or more attributes of a gesture used to provide the input to the touch input device; and
causing output of the haptic feedback based on the one or more attributes.

11. A computer-implemented method, comprising:
receiving an indication of input to a touch surface of a touch input device;
ascertaining whether haptic feedback for the input is to be initiated by an external haptic event received from a functionality representing one of an application or an operating system, or whether haptic feedback is to be initiated by an internal haptic event generated by the touch input device in response to the input, said ascertaining based on at least in part on a determination of whether the functionality supports haptic feedback; and
causing the touch input device to output haptic feedback based on one of the external haptic event or the internal haptic event, including at least one of:
in an event that a determination is made that the functionality directly supports haptic feedback, ascertaining that the haptic feedback for the input is to be initiated by the external haptic event received from the functionality; or
in an event that a determination is made that the functionality does not directly support haptic feedback, ascertaining that the haptic feedback is to be initiated by the internal haptic event generated by the touch input device in response to the input.

12. A method as described in claim 11, further comprising determining based on haptic data whether the functionality directly supports haptic feedback, and wherein said ascertaining comprises one of:
in an event that the haptic data indicates that the functionality directly supports haptic feedback, ascertaining that the haptic feedback for the input is to be initiated by the external haptic event received from the functionality; or in an event that the haptic data indicates that the functionality does not directly support haptic feedback, ascertaining that the haptic feedback is to be initiated by the internal haptic event generated by the touch input device in response to the input.

13. A method as described in claim 11, further comprising receiving a notification that the functionality directly supports haptic feedback, wherein said ascertaining comprises ascertaining that the haptic feedback for the input is to be initiated by the external haptic event, and said causing comprises causing the touch input device to output haptic feedback based on the external haptic event.

14. A method as described in claim 11, wherein said ascertaining comprises ascertaining that the haptic feedback for the input is to be initiated by the internal haptic event, and said causing comprises:

ascertaining one or more attributes of a gesture used to provide the input to the touch input device;

mapping the attributes of the gesture to haptic feedback; and causing output of the haptic feedback.

15. A computer-implemented method, comprising:

receiving an indication of input to a touch input device;

determining that a functionality external to the touch input device does not directly support haptic feedback, the functionality representing one of an application or an operating system;

ascertaining, responsive to said determining, that haptic feedback for the input is to be initiated by an internal haptic event generated by the touch input device in response to the input;

ascertaining one or more attributes of a gesture that caused the input; and causing the touch input device to output haptic feedback in response to the internal haptic event and based on the one or more attributes of the gesture.

16. A method as described in claim 15, wherein said determining comprises receiving a notification that the functionality does not directly support haptic feedback.

17. A method as described in claim 15, wherein the functionality comprises the application, the application does not directly support haptic feedback, and wherein the input comprises input to a graphical user interface of the application.

18. A method as described in claim 15, wherein the functionality comprises the operating system, and the operating system does not directly support haptic feedback.

19. A method as described in claim 15, wherein said ascertaining one or more attributes of the gesture comprises ascertaining one or more of a direction of movement of the gesture relative to the touch input device, distance of movement of the gesture, velocity of movement of the gesture, acceleration of the gesture, deceleration of the gesture, or an amount of pressure applied to the touch input device while generating the gesture.

20. A method as described in claim 15, wherein the functionality comprises the application, and wherein said causing is performed independent of information concerning an input context of the application.

\* \* \* \* \*